(12) United States Patent
Cook et al.

(10) Patent No.: US 10,977,705 B2
(45) Date of Patent: *Apr. 13, 2021

(54) METHOD OF CUSTOMIZING HEEL CUSHIONING IN ARTICLES OF FOOTWEAR

(71) Applicant: NIKE, Inc., Beaverton, OR (US)

(72) Inventors: Christopher S. Cook, Portland, OR (US); Shane S. Kohatsu, Portland, OR (US); Bret Schoolmeester, Banks, OR (US); Daniel T. Rowe, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/150,820

(22) Filed: Oct. 3, 2018

(65) Prior Publication Data

US 2019/0029366 A1 Jan. 31, 2019

Related U.S. Application Data

(63) Continuation of application No. 15/055,113, filed on Feb. 26, 2016, now Pat. No. 10,117,478.

(51) Int. Cl.
*G06Q 30/00* (2012.01)
*G06Q 30/06* (2012.01)
(Continued)

(52) U.S. Cl.
CPC ......... *G06Q 30/0621* (2013.01); *A43B 7/144* (2013.01); *A43B 7/1405* (2013.01);
(Continued)

(58) Field of Classification Search
CPC ...... A43B 13/186; A43B 13/12; A43B 13/141; A43B 13/16; A43B 13/188; A43B 13/22;
(Continued)

(56) References Cited

U.S. PATENT DOCUMENTS

| 2,700,230 A | 1/1955 | Beyer |
| 4,038,513 A | 7/1977 | Steigerwald |

(Continued)

FOREIGN PATENT DOCUMENTS

| CN | 202800331 U | 3/2013 |
| DE | 4333597 A1 | 4/1994 |
| EP | 0160415 A1 | 11/1985 |

OTHER PUBLICATIONS

Evlioglu, Simge. "Mass customization in footwear industry: setting up a Web based configurator." (2012). (Year: 2012).*

(Continued)

*Primary Examiner* — Matthew E Zimmerman
(74) *Attorney, Agent, or Firm* — Banner & Witcoff, Ltd.

(57) ABSTRACT

An article of footwear includes an upper and a sole structure with a sole member. The sole member can be manufactured using a system that modifies the heel cushioning of the sole member over a series of footwear purchases. The modifications can be configured to correspond to a customer's evaluation of the heel cushioning previously purchased. The sole member can include a set of apertures that are formed along various surfaces of the sole member to adjust the cushioning characteristics of the sole member.

20 Claims, 20 Drawing Sheets

(51) Int. Cl.
    *A43B 7/14*    (2006.01)
    *A43B 13/16*   (2006.01)
    *A43B 13/12*   (2006.01)
    *A43B 13/14*   (2006.01)
    *A43B 13/18*   (2006.01)
    *A43B 13/22*   (2006.01)
    *A43C 15/16*   (2006.01)
    *A43D 1/02*    (2006.01)

(52) U.S. Cl.
    CPC ............ *A43B 13/12* (2013.01); *A43B 13/141* (2013.01); *A43B 13/16* (2013.01); *A43B 13/186* (2013.01); *A43B 13/188* (2013.01); *A43B 13/22* (2013.01); *A43C 15/16* (2013.01); *A43D 1/02* (2013.01); *A43D 2200/60* (2013.01)

(58) Field of Classification Search
    CPC ....... A43B 7/1405; A43B 7/144; A43C 15/16; A43D 1/02; A43D 2200/60; G06Q 30/0621; G06Q 30/0601
    See application file for complete search history.

(56) References Cited

U.S. PATENT DOCUMENTS

| | | | |
|---|---|---|---|
| 4,364,189 A | 12/1982 | Bates | |
| 5,918,384 A | 7/1999 | Meschan | |
| 6,238,049 B1 | 5/2001 | Griffin et al. | |
| 7,398,608 B2 | 7/2008 | Schoenborn | |
| 7,607,241 B2 | 10/2009 | McDonald et al. | |
| 8,181,364 B2 | 5/2012 | Mayden et al. | |
| 8,234,798 B2 | 8/2012 | DiBenedetto et al. | |
| 8,584,377 B2 | 11/2013 | Blevens et al. | |
| 9,460,557 B1 | 10/2016 | Tran et al. | |
| 9,867,425 B2 | 1/2018 | Cook et al. | |
| 10,032,202 B2 | 7/2018 | Cook et al. | |
| 10,117,478 B2 | 11/2018 | Cook et al. | |
| 10,194,712 B2 | 2/2019 | Cook et al. | |
| 2001/0032400 A1 | 10/2001 | Brooks | |
| 2005/0071242 A1 | 3/2005 | Allen et al. | |
| 2006/0129416 A1 | 6/2006 | Shum | |
| 2007/0011173 A1 | 1/2007 | Agostino | |
| 2007/0043582 A1 | 2/2007 | Peveto et al. | |
| 2008/0276494 A1 | 11/2008 | Lacorazza et al. | |
| 2009/0089174 A1* | 4/2009 | Brunner | G06Q 30/06 705/26.5 |
| 2012/0180335 A1 | 7/2012 | Mahoney | |
| 2013/0110666 A1 | 5/2013 | Aubrey | |
| 2013/0167405 A1 | 7/2013 | Forsey | |
| 2014/0109440 A1 | 4/2014 | McDowell et al. | |
| 2014/0196308 A1* | 7/2014 | Baratta | A43B 13/125 36/29 |
| 2014/0268060 A1 | 9/2014 | Lee et al. | |
| 2014/0277663 A1* | 9/2014 | Gupta | G06Q 50/04 700/98 |
| 2015/0242929 A1* | 8/2015 | Wilkinson | G06Q 30/0631 705/26.7 |
| 2016/0345664 A1 | 12/2016 | Kohatsu et al. | |
| 2016/0345665 A1 | 12/2016 | Kohatsu et al. | |
| 2016/0345666 A1 | 12/2016 | Kohatsu et al. | |
| 2016/0345667 A1 | 12/2016 | Kohatsu et al. | |
| 2017/0150764 A1 | 6/2017 | Meloni | |

OTHER PUBLICATIONS

Cecilia Brennan, "Orthotic Recalls: Do you need to have your orthotics reassessed or refurbished?" http://www.sportandspinalphysio.com.au, XP055375489, Jul. 30, 2015.

Jun. 14, 2017—(WO) International Search Report and Written Opinion—App PCT/US2017/019673.

https://web.archive.org/web/20131205130305/http://www.shoesofprey.com/ (Year: 2013).

U.S. Appl. No. 15/055,086, filed Feb. 26, 2016.
U.S. Appl. No. 16/250,507, filed Jan. 17, 2019.
U.S. Appl. No. 16/018,878, filed Jun. 26, 2018.

* cited by examiner

METHOD OF CUSTOMIZING HEEL CUSHIONING IN ARTICLES OF FOOTWEAR

RELATED APPLICATION DATA

This application is a continuation of U.S. patent application Ser. No. 15/055,113 filed Feb. 26, 2016 and entitled "Method of Customizing Heel Cushioning in Articles of Footwear." U.S. patent application Ser. No. 15/055,113 is entirely incorporated herein by reference.

BACKGROUND

The present embodiments relate generally to articles of footwear, and in particular to articles with cushioning provisions and methods of making such articles.

Articles of footwear generally include two primary elements: an upper and a sole member. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over the instep and toe areas of the foot, along medial and lateral sides of the foot, and around a heel area of the foot. The upper may also incorporate a lacing system to adjust the fit of the footwear, as well as permitting entry and removal of the foot from the void within the upper.

The sole member is secured to a lower portion of the upper so as to be positioned between the foot and the ground. In athletic footwear, for example, the sole member includes a midsole and an outsole. The various sole components may be formed from a polymer foam material that attenuates ground reaction forces (i.e., provides cushioning) during walking, running, and other ambulatory activities. The sole member may also include fluid-filled chambers, plates, moderators, or other elements that further attenuate forces, enhance stability, or influence the motions of the foot, for example.

SUMMARY

In one aspect, the present disclosure is directed to a method of manufacturing articles of footwear, comprising manufacturing a first article of footwear having a first sole member with a first level of heel cushioning. The first sole member being formed from a first base sole layer, providing a user with the first article of footwear, providing the user with a rating system for evaluating the first level of heel cushioning and requesting that the user provide a customer-selected rating of the first level of heel cushioning, and receiving the customer-selected rating from the user for the first level of heel cushioning. The method further includes selecting a second base sole layer similar to the first base sole layer, forming at least a first aperture in a heel portion of the second base sole layer to form a second sole member with a second level of heel cushioning, where the second level of heel cushioning is determined by the customer-selected rating of the first level of heel cushioning in the first article of footwear, and providing the user with a second article of footwear including the second sole member.

In another aspect, the present disclosure is directed to a method of manufacturing articles of footwear, comprising manufacturing a first article of footwear having a first sole member. The first sole member being fixedly attached to the first article of footwear and having a first level of heel cushioning, where the first sole member is formed from a first base sole layer that includes a first heel portion, and providing a user with the first article of footwear. The method further includes providing the user with a rating system for evaluating the first level of heel cushioning and requesting that the user provide a customer-selected rating of the first level of heel cushioning, receiving the customer-selected rating from the user for the first level of heel cushioning, then selecting a second base sole layer with a second heel portion to form a second sole member with a second level of heel cushioning, where the material composition of the second heel portion is determined by the customer-selected rating of the first level of heel cushioning in the first article of footwear, and where the second heel portion is fixedly attached to the second base sole layer, and providing the user with a second article of footwear that includes the second sole member, where the second sole member is fixedly attached to the second article of footwear.

In another aspect, the present disclosure is directed to a method of manufacturing articles of footwear, comprising manufacturing a first article of footwear having a first sole member with a first level of heel cushioning. The first sole member being formed from a first base sole layer, providing a user with the first article of footwear, providing the user with a rating system for evaluating the first level of heel cushioning and requesting that the user provide a customer-selected rating of the first level of heel cushioning, and receiving the customer-selected rating from the user for the first level of heel cushioning. The method further includes selecting a second base sole layer similar to the first base sole layer, forming at least a first aperture in a heel portion of the second base sole layer to form a second sole member with a second level of heel cushioning, where the second level of heel cushioning is determined by the customer-selected rating of the first level of heel cushioning in the first article of footwear, providing the user with a second article of footwear including the second sole member, and providing the user with a rating system for evaluating the second level of heel cushioning and requesting that the user provide a customer-selected rating of the second level of heel cushioning. In addition, the method includes receiving the customer-selected rating from the user for the second level of heel cushioning, selecting a third base sole layer similar to the second base sole layer, forming at least a second aperture in a heel portion of the third base sole layer to form a third sole member with a third level of heel cushioning, where the third level of heel cushioning is determined by the customer-selected rating of the second level of heel cushioning in the second article of footwear, and providing the user with a third article of footwear including the third sole member.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments.

Moreover, in the figures, like reference numerals designate corresponding parts throughout the different views.

DETAILED DESCRIPTION

The figures depicted herein provide different embodiments of a heel-cushioning system for an article of footwear. A cushioning system can include provisions for increasing flexibility, fit, comfort, and/or stability during deformation or use of the cushioning material or the article incorporating the cushioning element. Some of the embodiments of cushioning systems as disclosed herein may be utilized in various articles of apparel.

Figure 1:
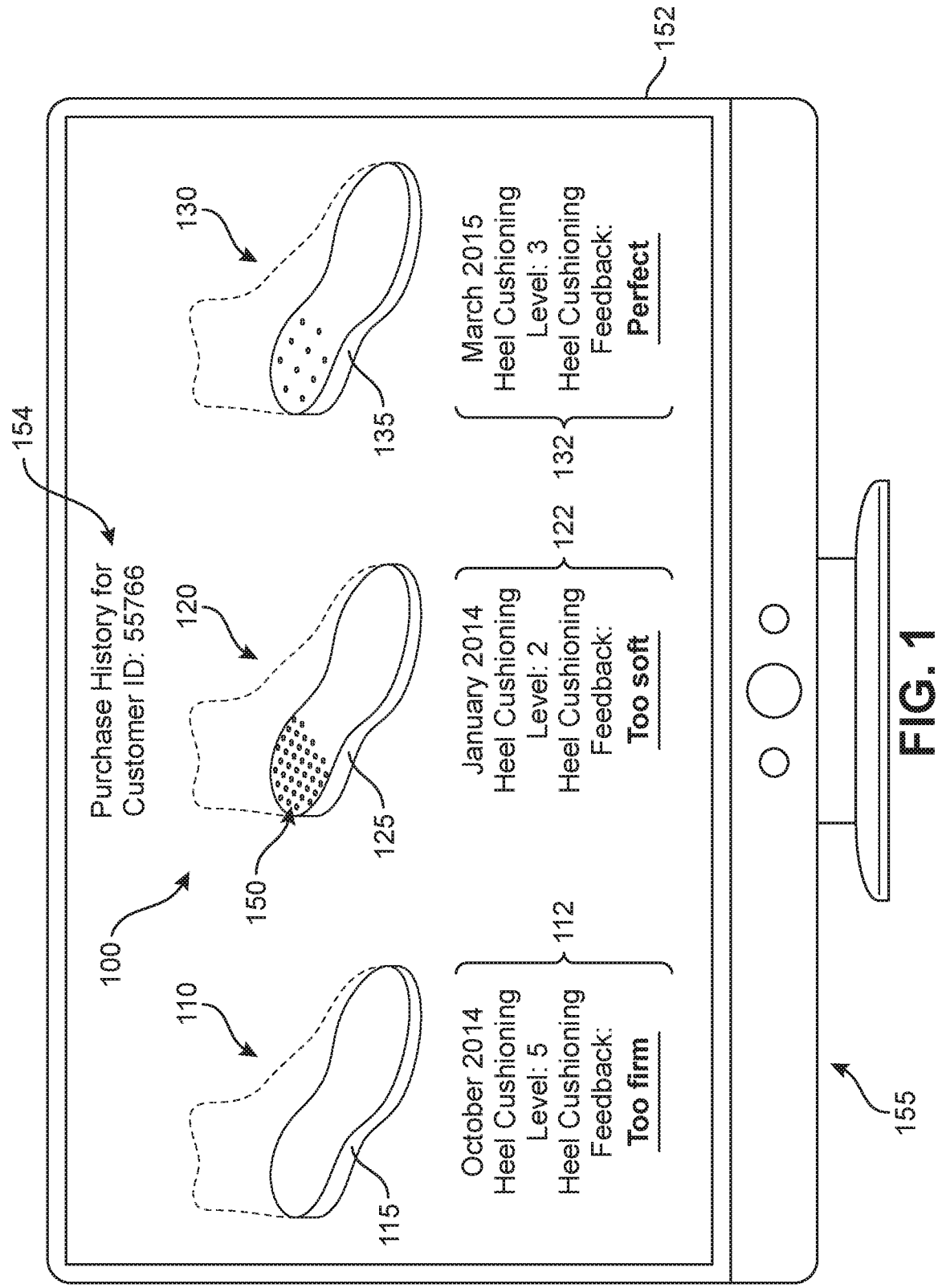
FIG. 1 schematically illustrates an embodiment of a virtual image of three articles of footwear and corresponding data.

The following discussion and accompanying figures disclose embodiments of various sole structures for articles of footwear ("articles") 100, as shown in FIG. 1. The provisions discussed herein for the article of footwear and sole structure could be incorporated into various other kinds of footwear including, but not limited to, basketball shoes, hiking boots, soccer shoes, football shoes, sneakers, running shoes, cross-training shoes, rugby shoes, rowing shoes, baseball shoes as well as other kinds of shoes. Moreover, in some embodiments, the provisions discussed herein for articles could be incorporated into various other kinds of non-sports-related footwear including, but not limited to, slippers, sandals, high-heeled footwear, and loafers. Accordingly, the concepts disclosed herein apply to a wide variety of footwear types.

For purposes of clarity, the following detailed description discusses the features of articles 100. However, it will be understood that other embodiments may incorporate a corresponding article of footwear (e.g., a left article of footwear when one of articles 100 is a right article of footwear) that may share some, and possibly all, of the features of any articles 100 described herein and shown in the figures.

Furthermore, to assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). A longitudinal direction may extend along a longitudinal axis, which itself extends between a forefoot region and a heel region of the component. The term "forward" is used to refer to the general direction in which the toes of a foot point, and the term "rearward" is used to refer to the opposite direction, i.e., the direction in which the heel of the foot is facing. The terms forward and rearward may be used to describe the location of elements relative to one another along the sole structure.

In addition, the term "lateral" as used throughout this detailed description and in the claims refers to a direction extending along a width of a component. A lateral direction may extend along a lateral axis, which itself extends between a medial side and a lateral side of a component. In other words, the lateral direction may extend between a medial side and a lateral side of an article of footwear, with the lateral side of the article of footwear being the surface that faces away from the other foot, and the medial side being the surface that faces toward the other foot.

Furthermore, the term "vertical" as used throughout this detailed description and in the claims refers to a direction extending along a vertical axis, which itself is generally perpendicular to a lateral axis and a longitudinal axis. For example, in cases where an article is planted flat on a ground surface, a vertical direction may extend from the ground surface upward. This detailed description makes use of these directional adjectives in describing an article and various components of the article, including an upper, a midsole structure, and/or an outer sole structure.

The term "vertical" as used throughout this detailed description and in the claims refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading toward the ground surface. Similarly, the terms "top," "upper" (when not used in context of the upper component in an article of footwear), and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" or "exterior" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe. In addition, the term "proximal" refers to a direction that is nearer a center of a footwear component, or is closer toward a foot when the foot is inserted in the article as it is worn by a user. Likewise, the term "distal" refers to a relative position that is further away from a center of the footwear component or upper. Thus, the terms proximal and distal may be understood to provide generally opposing terms to describe the relative spatial position of a footwear layer.

Furthermore, throughout the following description, the various layers or components of a sole structure may be described with reference to a proximal side and a distal side. In embodiments in which a sole structure comprises multiple components (as will be discussed further below), the proximal side will refer to the surface or side of the specified layer or component that faces the upper and/or faces toward the foot-receiving interior cavity formed in the article. In addition, the distal side will refer to a side of the component that is opposite to the proximal side of the component. In some cases, the distal side of a component is associated with the outermost surface or side. Thus, a proximal side may be a side of a layer or component of the sole structure that is configured to face upward, toward a foot or a portion of an upper. A distal side may be a surface side of a component of a sole structure that is configured to face toward a ground surface during use of the article.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components).

Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, threaded connectors, cam-locking connectors, compression of one material with another, and other such readily detachable connectors.

Referring to FIG. 1, an embodiment of an overview of one aspect of a customization system 155 is depicted on a sample display screen ("screen") 152. In some embodiments, customization system 155 can include a record of a purchase history ("purchase history") 154 for a customer. In FIG. 1, a first article 110, a second article 120, and a third article 130 are shown, generally representing purchase history 154 over a period of time. As shown on screen 152, in some embodiments, the listing of first article 110 may further include some details regarding first article 110, such as the customer's feedback regarding use of first article 110. In one embodiment, information regarding first article 110 may be captured or provided in a first assessment record 112 by the customer in customization system 155. Similarly, in some embodiments, information regarding second article 120 may be provided in a second assessment record 122 by the customer in customization system 155. Furthermore, in some embodiments, information regarding third article 130 may be provided in a third assessment record 132 by the customer in customization system 155.

As will be discussed throughout this description, in some embodiments, the level of heel cushioning in each of articles 100 may be modified. In different embodiments, heel cushioning can be modified or adjusted in various ways. For example, in some embodiments, a sole member or layer of a sole structure can include one or more apertures 150 that may affect the degree of heel cushioning. For purposes of this description, apertures 150 are openings, apertures, holes, tunnels, or spaces that are disposed within a sole member. Apertures 150 can comprise a void in some embodiments. As will be discussed further below, in some embodiments, apertures 150 are initially formed along an exterior or outer surface of a sole member, and can extend any distance, and along any orientation, through an interior portion (e.g., the thickness, breadth, or width) of the sole member. It should be understood that the terms exterior or outer surface with reference to a sole member do not necessarily indicate whether the sole member is actually exposed to the outer elements. Instead, an outer surface or exterior surface refers to the outermost, outward-facing layer of the sole member. Throughout the specification, it should be understood that characteristics being described as associated with a single aperture or aperture set can also characterize any other aperture or aperture set that may be referred to in the various embodiments.

The embodiments described herein may also include or refer to techniques, concepts, features, elements, methods, and/or components from: (a) U.S. patent application Ser. No. 14/722,758, filed May 27, 2015, titled "Article Of Footwear Comprising A Sole Member With Apertures," (b) U.S. patent application Ser. No. 14/722,826, filed May 27, 2015, titled "Article Of Footwear Comprising A Sole Member With Geometric Patterns," (c) U.S. patent application Ser. No. 14/722,740, filed May 27, 2015, titled "Article Of Footwear Comprising A Sole Member With Regional Patterns," and (d) U.S. patent application Ser. No. 14/722,782, filed May 27, 2015, titled "Article Of Footwear Comprising A Sole Member With Aperture Patterns," the entirety of each application being herein incorporated by reference.

In some embodiments, apertures 150 can provide means for decoupling or softening portions of a sole member in order to enhance its cushioning characteristics. For purposes of this disclosure, cushioning characteristics refer to the degree of fit, flexibility, cushioning, responsiveness, comfort, resilience, shock absorption, elasticity, and/or stability present in a portion of an element. For example, in some cases, apertures 150 can be formed in side portions and a lower portion of a sole member to reduce the cross-sectional profile of the sole member at particular regions and/or to facilitate increased flexibility between various portions of the sole member.

In one embodiment, apertures 150 can be applied to side portions and an upper portion to form regions between adjacent portions of the sole member that articulate or bend with respect to one another.

In some embodiments, apertures 150 can have different shapes. In one embodiment, apertures 150 have a round cross-sectional shape. In other embodiments, apertures 150 may include a wide variety of other geometries, including regular and irregular shapes. Apertures 150 may have a cross-sectional shape that is elliptical, square, or triangular, for example. In some embodiments, apertures 150 may have a variety of geometric shapes that may be chosen to impart specific aesthetic or functional properties to a cushioning element. In one embodiment, apertures 150 may comprise a void that has a substantially cylindrical shape. In some embodiments, the cross-sectional diameter of the aperture may be substantially consistent or uniform throughout the length of the aperture, while in other embodiments, the diameter may change through the length of the aperture.

In some embodiments, apertures 150 can be provided on or through a lower surface (nearer to the ground-contacting surface) or an upper surface (nearer to an upper) of the sole member. In other cases, apertures 150 can be provided on or through a side surface of the sole member. In one embodiment, apertures 150 can be provided on or through the side surfaces of the sole member as well as on the lower surface and the upper surface of the sole member.

Generally, apertures 150 can comprise various openings or holes arranged in a variety of orientations and in a variety of locations on or through the sole member. In some embodiments, one or more apertures 150 can extend in a direction generally aligned with a vertical axis through a thickness of the sole member. Thus, in one embodiment, an aperture comprises an opening (i.e., gaps or holes) along an exterior surface of the sole member. In other words, apertures 150 may extend from an initial hole along an exterior surface to form apertures of varying sizes and lengths through the thickness of a sole member. Apertures 150 may be blind-hole apertures in some embodiments, where only one end of each of the aperture is open or exposed, while the opposite end of each of the aperture remains enclosed within the thickness of the element (i.e., only one end of each aperture may be exposed on an exterior surface of the element). However, in other embodiments, apertures 150 may be through-hole apertures, such that an aperture includes two exposed ends, and both ends are "open" along an exterior surface of the sole member.

Thus, in the present embodiments, the operation of the sole member can involve providing a material variance in the element. The material variance can be accomplished by providing voids (apertures), which can comprise cut-outs through the cushioning element. As will be described below with respect to FIG. 12, in some embodiments, the cut-outs can involve a removal of material from the element, thereby providing softer and/or cushioned regions in the portions that include the apertures.

Referring again to FIG. 1, it can be seen that each of articles 100 includes differently configured sole members relative to the other articles 100. For example, first article 110 has a substantially continuous first sole member 115, such that no apertures are present. In contrast, second article 120 includes a first pattern of apertures 150 disposed along the heel region of a second sole member 125. The forefoot region, midfoot region, and heel region of an article of footwear will be discussed in further detail with respect to the larger view of an article of footwear provided in FIG. 7. Furthermore, a third sole member 135 of third article 130 includes a second pattern of apertures 150 that is different from the second pattern of apertures 150 formed in second sole member 125 of second article 120. As described above, the inclusion of apertures can affect the cushioning characteristics of a sole member.

Thus, it may be understood that in the embodiment presented in FIG. 1, each sole member in the three articles has different cushioning characteristics. For example, in some embodiments, the heel region of first sole member 115 may be relatively stiffer or more rigid with respect to the heel regions of either of second sole member 125 and third sole member 135, due to the absence of any apertures. Furthermore, in some embodiments, the heel region of second sole member 125 may comprise a greater degree of cushioning (or less stiffness) relative to the heel region of third sole member 135.

In different embodiments, the varied cushioning characteristics of the heel regions of each sole member in FIG. 1 can be evaluated by a customer or user. In one embodiment, the assessments for each article of footwear can reflect an evaluation by the customer of the cushioning characteristics of the article. For example, first assessment record 112 as shown in FIG. 1 lists a user's evaluation of the heel cushioning of first article 110. In first assessment record 112, it can be seen that the customer has provided a rating of "too firm" for first sole member 115 in terms of his or her personal heel cushioning preferences, while the manufacturer's cushioning level for first sole member 115 is identified as "5". It should be understood that any numerals or ratings described herein are for illustrative purposes only, and any other rating system may be utilized with the disclosed embodiments. In this case, 5 is a rating along a scale from 1 to 10. However, in other cases, the rating scale used by a manufacturer can vary.

Similarly, second assessment record 122 as shown in FIG. 1 lists an evaluation by the same user of the heel cushioning of second article 120. In second assessment record 122, it can be seen that the customer has provided a rating of "too soft" for second sole member 125 in terms of his or her personal heel cushioning preferences, while the manufacturer's cushioning level is identified as "2" for second sole member 125. In addition, third assessment record 132 as shown in FIG. 1 lists an evaluation of the heel cushioning of third article 130 by the same user. In third assessment record 132, it can be seen that the customer has provided a rating of "perfect" for third sole member 135 in terms of his or her personal heel cushioning preferences, while the manufacturer's cushioning level is identified as "3" for third sole member 135.

Thus, in different embodiments, a customer may be able to purchase or otherwise obtain a series of articles 100 that generally provide increasingly comfortable and desired heel-cushioning characteristics for that particular customer. Over a period of time, in some embodiments, a customer may receive an article that is deemed to be at the "perfect" or optimal heel cushioning level by the customer.

Figure 2:
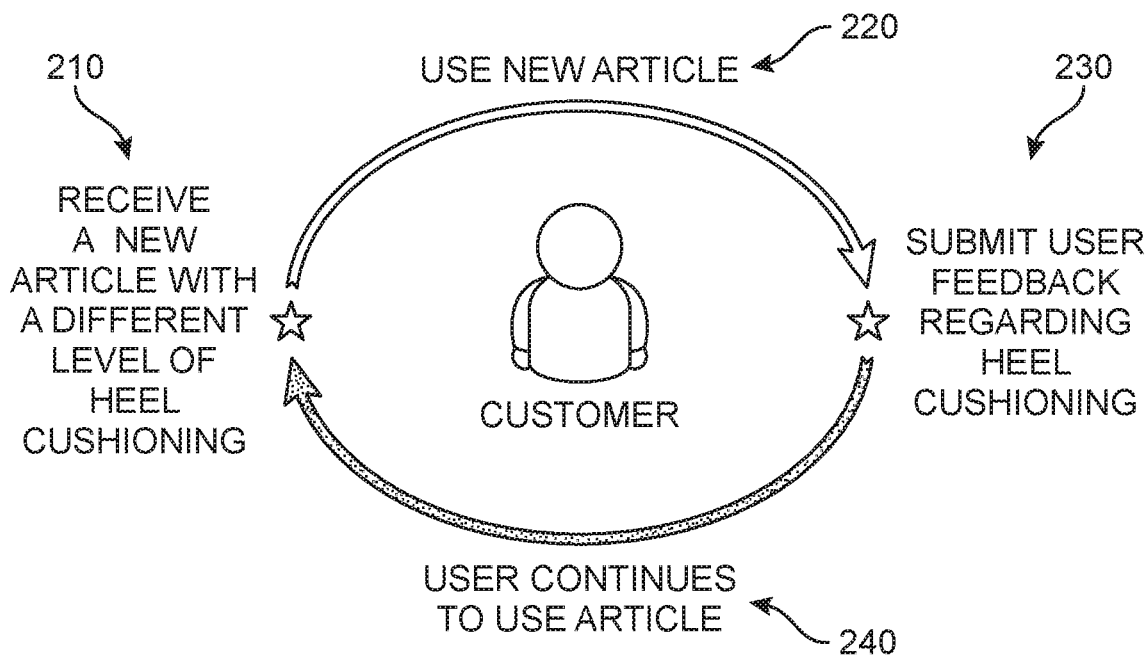
FIG. 2 is an embodiment of a schematic depiction of a customer's use of the customization system.

Referring now to FIG. 2, an embodiment of a processing cycle for a customer is depicted. FIG. 2 presents a high-level introduction to the system from the perspective of the customer. In some embodiments, a user may initially purchase or receive a new article of footwear with a particular level of heel cushioning, as indicated in a first step 210. The user may use the new article of footwear in a second step 220. After having used the article of footwear, the user may evaluate and provide feedback regarding his or her experience with the article of footwear in a third step 230. The user may continue using the article of footwear in a fourth step 240 before receiving a new article of footwear.

Figure 3:
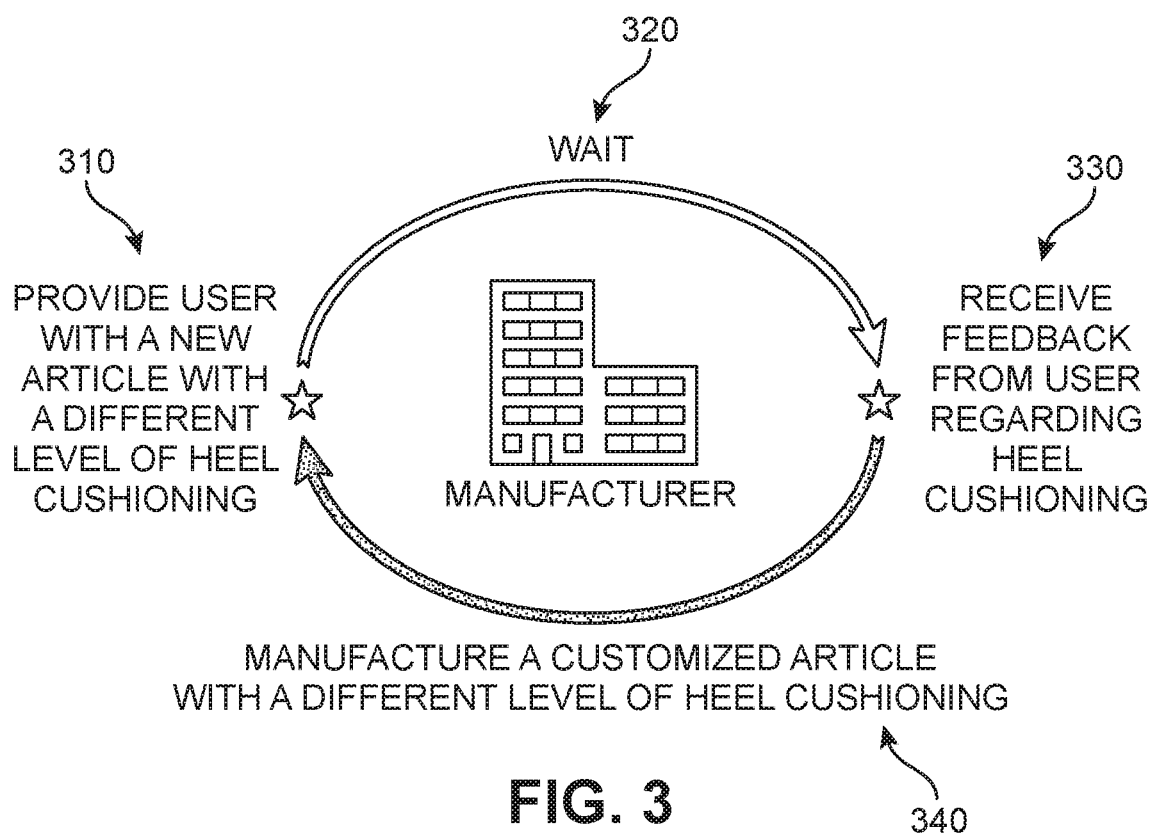
FIG. 3 is an embodiment of a schematic depiction of a manufacturer's use of the customization system.

FIG. 3 an embodiment of a processing cycle for a manufacturer is depicted. FIG. 3 presents a high-level introduction to the system from the perspective of the manufacturer. In some embodiments, a manufacturer may sell or provide a new article of footwear to a user with a particular level of heel cushioning, as indicated in a first step 310. The manufacturer may wait for a period of time (for example, while the article of footwear is used) in a second step 320. After waiting, the manufacturer may receive feedback regarding the user's experience with the article of footwear in a third step 330. The manufacturer may manufacture a new article of footwear with a new level of heel cushioning in a fourth step 340, where the new level is at least in part based on the feedback received in third step 330.

It is clear that each of the processes discussed above is cyclical so that each step can occur multiple times over the lifetime of the customer-manufacturer (or customer-proprietor) relationship. In particular, and as discussed in further detail below, such a cycle provides for iterating customizable features in footwear until the point where a given customized feature has been deemed ideal, or close enough within some tolerance, for a user or customer. In other words, the cycle could be repeated 2, 3, 4, 5, 6, 7, 8, 9, 10, and up to N times, where N is any number. Moreover, the process repeated N times provides a user or customer with N or N+1 different pairs of footwear.

The time required to complete a cycle may vary and need not be constant between cycles. In some embodiments, a manufacturer may arrange for the process to be completed at regular intervals so that a new customized article is provided at regularly scheduled times. However, in other embodiments, the cycle length could vary according to how long the customer waits to provide feedback and/or how long before the customer orders a new pair of footwear and the manufacturer can begin manufacturing the new customized pair of articles.

Although the embodiments discuss a method conducted by a manufacturer, in other embodiments, the customization method described herein may more broadly be operated or conducted by a proprietor (or proprietors). A proprietor may include one or more factories, multiple offices, retailers, and various other establishments associated with a business. Generally, the term "proprietor," as used here, may also refer to distributors and/or suppliers. In other words, the term proprietor may also apply to various operations on the manufacturing side, including the operations responsible for parts, labor, and/or retail of the article of footwear, as well as other manufacturing side operations.

Figure 4:
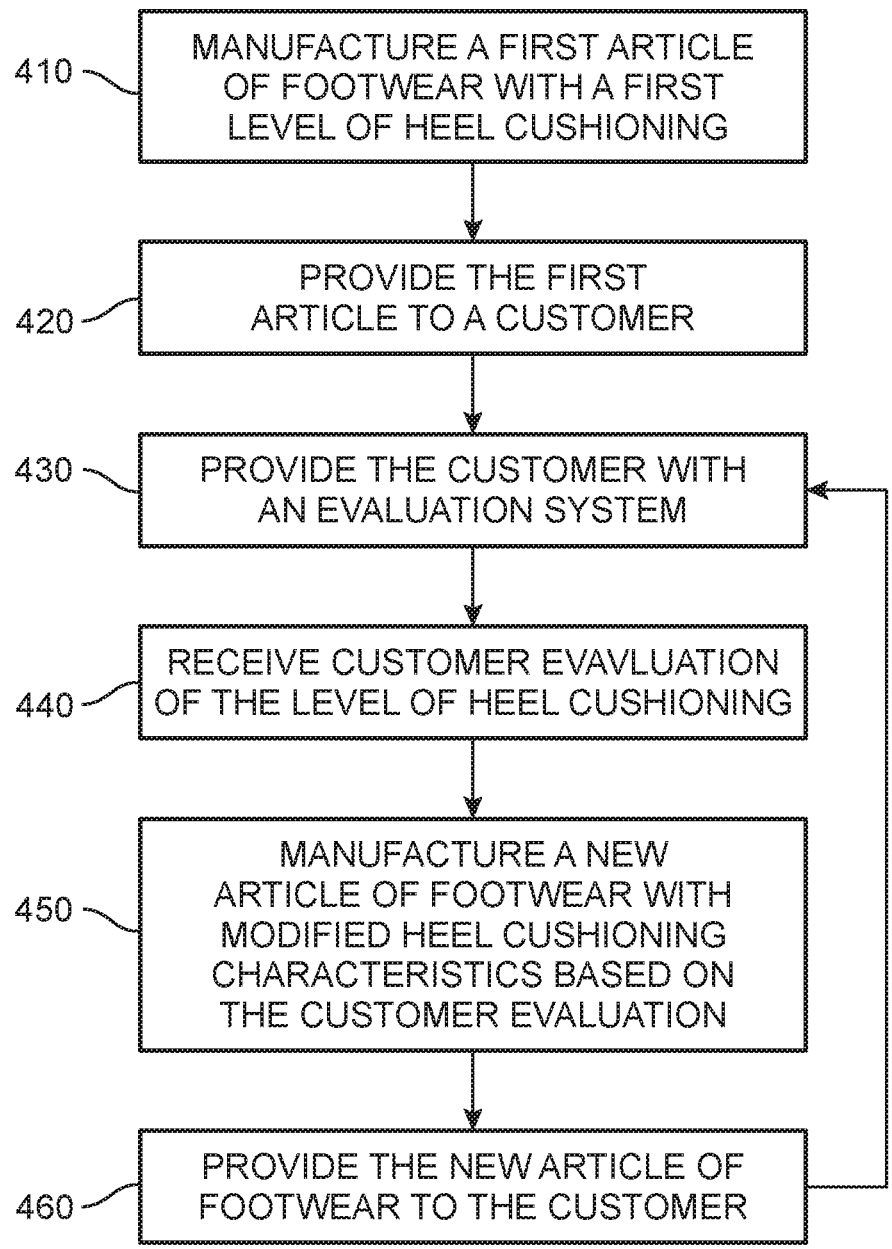
FIG. 4 is an embodiment of a flow chart for a method of providing a custom article of footwear to a customer.

Referring now to FIG. 4, an embodiment of an overview of the method described herein is depicted in a flow chart. In some embodiments, a manufacturer may initially manufacture a first article of footwear with a first level of heel cushioning in a first step 410. The first article of footwear can be provided to a customer in a second step 420. In addition, an evaluation system directed to the heel cushioning can be provided to the same customer, as shown in a third step 430. The results of the evaluation, or the assessment, by the customer may be received by the manufacturer in a fourth step 440. In a fifth step 450, the manufacturer can manufacture a new article of footwear that has modified heel-cushioning characteristics relative to the previous article of footwear for which an evaluation was received (see fourth step 440). The new article of footwear can be provided to the customer in a sixth step 460. It should be noted that at least the lower four steps (third step 430, fourth step 440, fifth step 450, and sixth step 460) of the flow chart may represent a subcycle that can be repeated through this method multiple times. In other words, once the customer has received the new article of footwear, the customer may continue to provide feedback about the new level of heel cushioning, and also may continue to receive new articles of footwear with modified cushioning characteristics.

For purposes of clarity to the reader, in some cases, the term rating system may be used interchangeably with evaluation system. The term "evaluation system" as used throughout this detailed description and in the claims refers to any system that can be used by a customer or user to evaluate one or more articles of footwear. In some embodiments, an evaluation system could comprise a means for evaluating one or more features of an article of footwear, including one or more structural characteristics. An evaluation system can be comprised of one or more questions or statements that prompt a user to provide evaluation or feedback in the form of comments and/or selecting one or more of a predefined number of responses. The responses may take the form of qualitative indicators and/or quantitative indicators.

In some embodiments, an evaluation system may comprise a set of information necessary for a customer to make an evaluation of one or more structural characteristics of an article of footwear. For example, an evaluation system may incorporate questions, instructions, evaluation criteria, a scale or range of possible evaluations or ratings, as well as any other information required for a user to evaluate an article of footwear and provide evaluation information back to the manufacturer (or a third party). As discussed in further detail below, in at least some embodiments, an evaluation system is comprised of one or more physical resources that allow for a user to efficiently provide evaluations (or ratings) directly to the manufacturer. In one embodiment (shown later in FIG. 9), an evaluation system includes at least a mobile computing device (e.g., a smartphone) that can run an application. By using the application, a customer can enter in evaluation information that can then be transmitted by the mobile device back to computing systems associated with the manufacturer.

Figure 5:
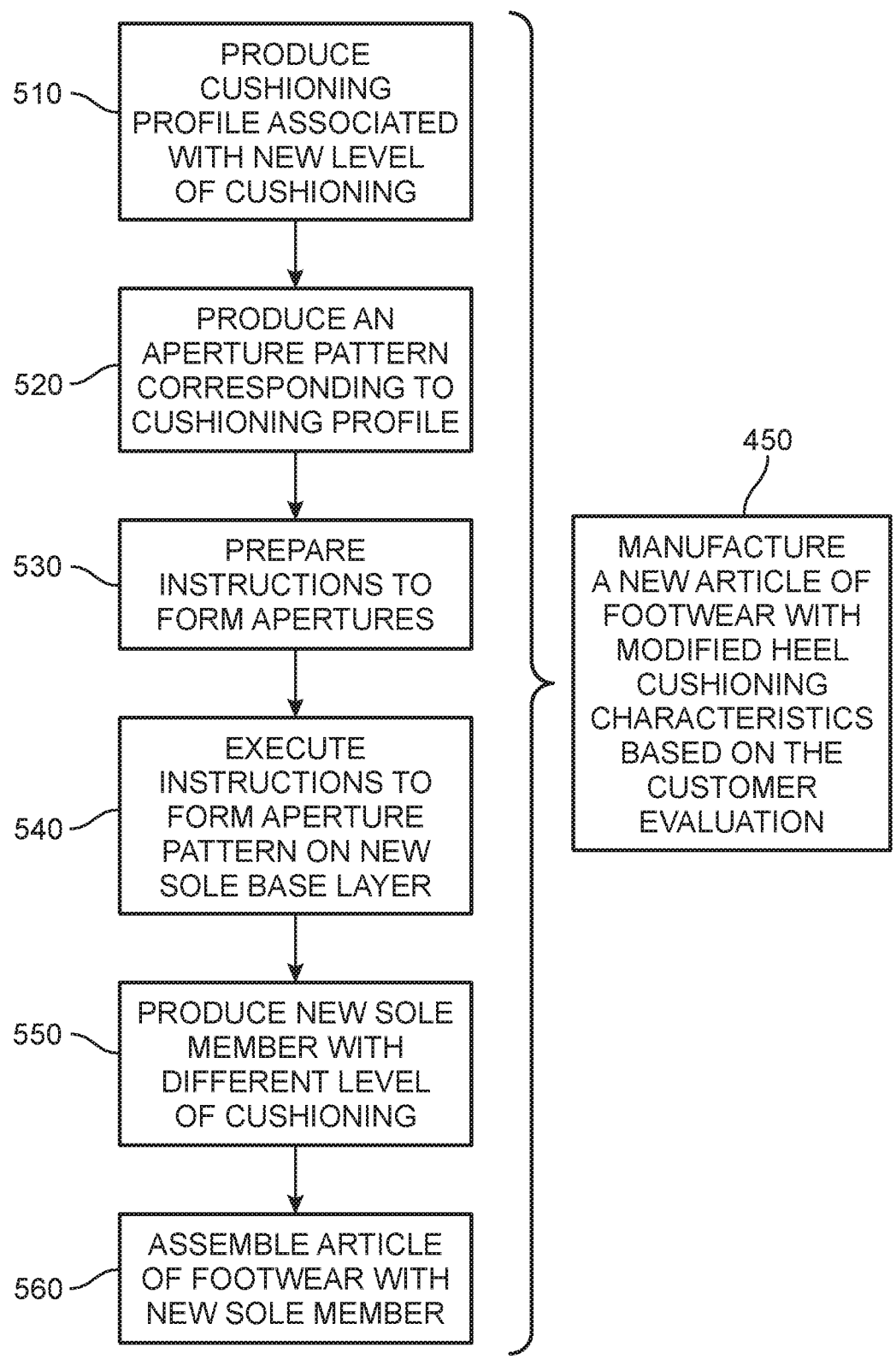
FIG. 5 is an embodiment of a flow chart for a method of making a custom sole member with apertures.

Thus, in some embodiments, customized sole members as described herein can be manufactured at least in part based on the preferences of individual customers. The sole members can provide a personalized heel cushioning experience in some embodiments. An embodiment of the sole member production process is outlined in the flow chart of FIG. 5, generally representing an embodiment of steps that may occur during fifth step 450 of FIG. 4. Referring to FIG. 5, in a first step 510, the information received from the customer's evaluation can be collected to generate a cushioning or resiliency profile that is associated with a modified level of heel cushioning in a base sole layer or base sole component. In a second step 520, the cushioning profile may be used to produce a custom configuration or pattern of apertures (e.g., position, size, lengths, orientation, etc.) in a sole member. The particular configuration of apertures generated may be stored in a virtual or digital form in some embodiments. Following the production of an aperture pattern, instructions to form the apertures in a sole member may be prepared or generated in a third step 530. In some cases, the aperture pattern may be converted into a series of commands or instructions for a system to follow in order to translate the aperture pattern into mechanical or design steps for forming the customized sole member. In a fourth step 540, the instructions are executed and, in a fifth step 550, a custom sole member is produced with a modified level of heel cushioning. A new article of footwear is assembled with the new sole member in a sixth step 560.

The processes described herein (for example, in FIGS. 4 and 5) may occur in rapid succession and in close proximity to one another in some embodiments. However, in other embodiments, one or more steps may occur spaced apart in time and location. In other words, one step may occur in a first location, and another step may occur in a second location, where the first location is different from the second location. For example, the cushioning profile of first step 510 may be produced offsite (e.g., at a shopping outlet or a medial office, etc.), and the aperture pattern of second step 520 may be produced in a manufacturing facility. In another example, the instructions for forming the apertures of third step 530 may be prepared or generated in a local site, while the actual production of the custom sole member of fifth step 540 may occur in a remote site (e.g., out of state, or abroad).

Figure 6:
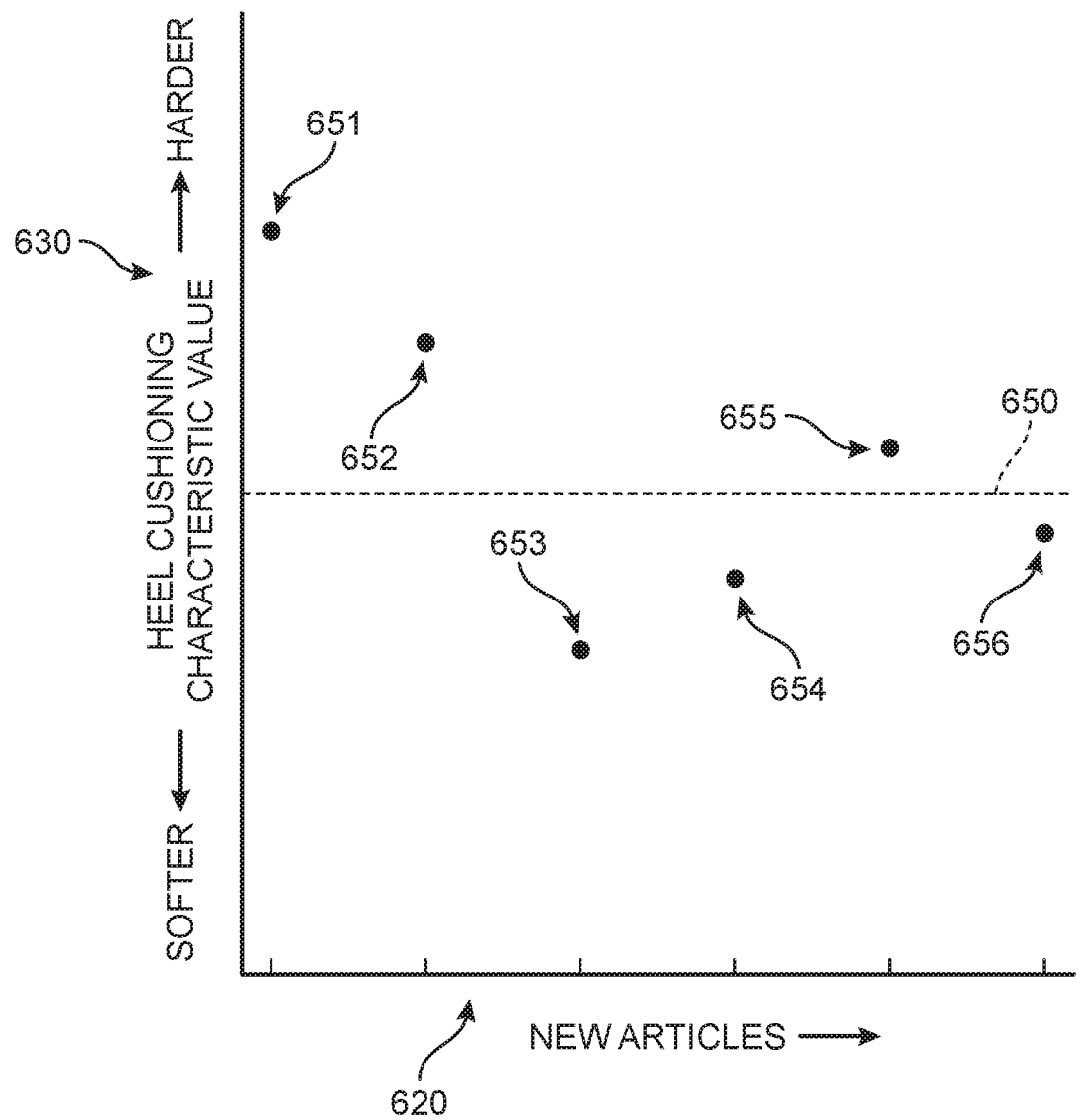
FIG. 6 is an embodiment of a graph representing the heel-cushioning levels of a series of articles of footwear.

Referring now to FIG. 6, an example of a customer's heel-cushioning-level history for a series of footwear purchases is shown. FIG. 6 is a graph with six data points. It should be understood that the data presented herein is for illustrative purposes only, and does not limit the type of heel cushioning a customer can be provided with, nor does it limit the range of feedback that can be provided by a customer. In FIG. 6, an example of a series of articles' heel-cushioning levels (illustrated by a series of dots) is schematically represented, where each of the levels are associated with a single customer ID (identified at the top of the graph). In some embodiments, the single customer ID is understood to refer to the purchase history of a single individual. The graph includes a Purchase History axis 620 (labeled as "New Articles") and a Heel Cushioning Level axis 630 (labeled as "Heel Cushioning Characteristic Value").

In FIG. 6, the values along the bottom or x-axis of the chart indicate different articles of footwear that have been manufactured over time (time increases toward the right). In this particular example, a dotted line has been provided to indicate an ideal value 650 in the chart of the selected structural characteristic. This ideal value is not necessarily known ahead of time, and may only be determined by providing a best fit of the data. This chart makes it clear that over time user feedback affects the value of the structural characteristic in a subsequent article of footwear, and does so in a way that allows the ideal value to be honed in on, or found, over time. Generally, each new article of footwear has a value for the structural characteristic that is closer to the ideal value than the values for previous articles.

It may be appreciated that some error between a given structural characteristic value for a particular article and the ideal value may always exist, as manufacturing efficiency makes it difficult to provide articles with any continuous value of a particular characteristic (e.g., width or arch height). However, the customization cycle is intended to operate so that over time this error is reduced to within at least some threshold or tolerance of an ideal value. Furthermore, the amount of error may also depend on how long the cycle is continued. For example, a customer that has gone through four or five cycles (i.e., purchased and provided feedback on four or five pairs of footwear) may generally find characteristic values that are closer to his or her ideal than a customer who has only gone through the cycle twice.

It may also be appreciated that the ideal value indicated in FIG. 6 could vary as a customer ages, loses weight, or otherwise changes over time. For example, a customer who initially prefers a high degree of cushioning in her running shoes may over time develop a preference for a lower degree of cushioning. The customization system discussed herein allows for subsequent articles to be adapted to fit the customer's changing preferences. Customers, therefore, need not worry about their particular shoe width or some absolute cushioning preference in selecting shoes—they can simply provide feedback about their desired width or cushioning levels relative to their current shoes.

When the first article of footwear is purchased, first marker 651 is associated with a relatively high level of stiffness. In a subsequent purchase, the same customer ID receives a second article of footwear with a lower level of stiffness—represented by a second marker 652—relative to first marker 651. The third article of footwear purchased, represented by a third marker 653, has a lower level of stiffness relative to second marker 652. In addition, the third article of footwear has the lowest heel stiffness along the entire purchase history in this embodiment. When a fourth article of footwear is received, as represented by a fourth marker 654, it includes a heel-cushioning level higher than the third article of footwear (third marker 653), but lower than the second article of footwear (second marker 652) such that it is slightly stiffer than the third article of footwear. The fifth article of footwear, represented by a fifth marker 655, has a heel-cushioning level higher than the fourth article of footwear (fourth marker 654), but still lower than the second article of footwear (second marker 652) such that it is slightly stiffer than the fourth article of footwear. Finally, the purchase of the sixth article of footwear, represented by a sixth marker 656, includes a heel-cushioning level lower than the fifth article of footwear (fifth marker 655), but higher than the fourth article of footwear (fourth marker 654) such that it is slightly softer than the fifth article of footwear.

Thus, it can be seen that in some embodiments, the variance of cushioning levels can decrease over a series of purchases. In other words, the heel-cushioning levels can "stabilize" over time, as the level begins to more closely correlate to the desired level of cushioning of a user. In this embodiment, the desired level is indicted by ideal value 650 (dotted line), generally representing the ideal or optimal cushioning level for this particular customer.

Figure 7:
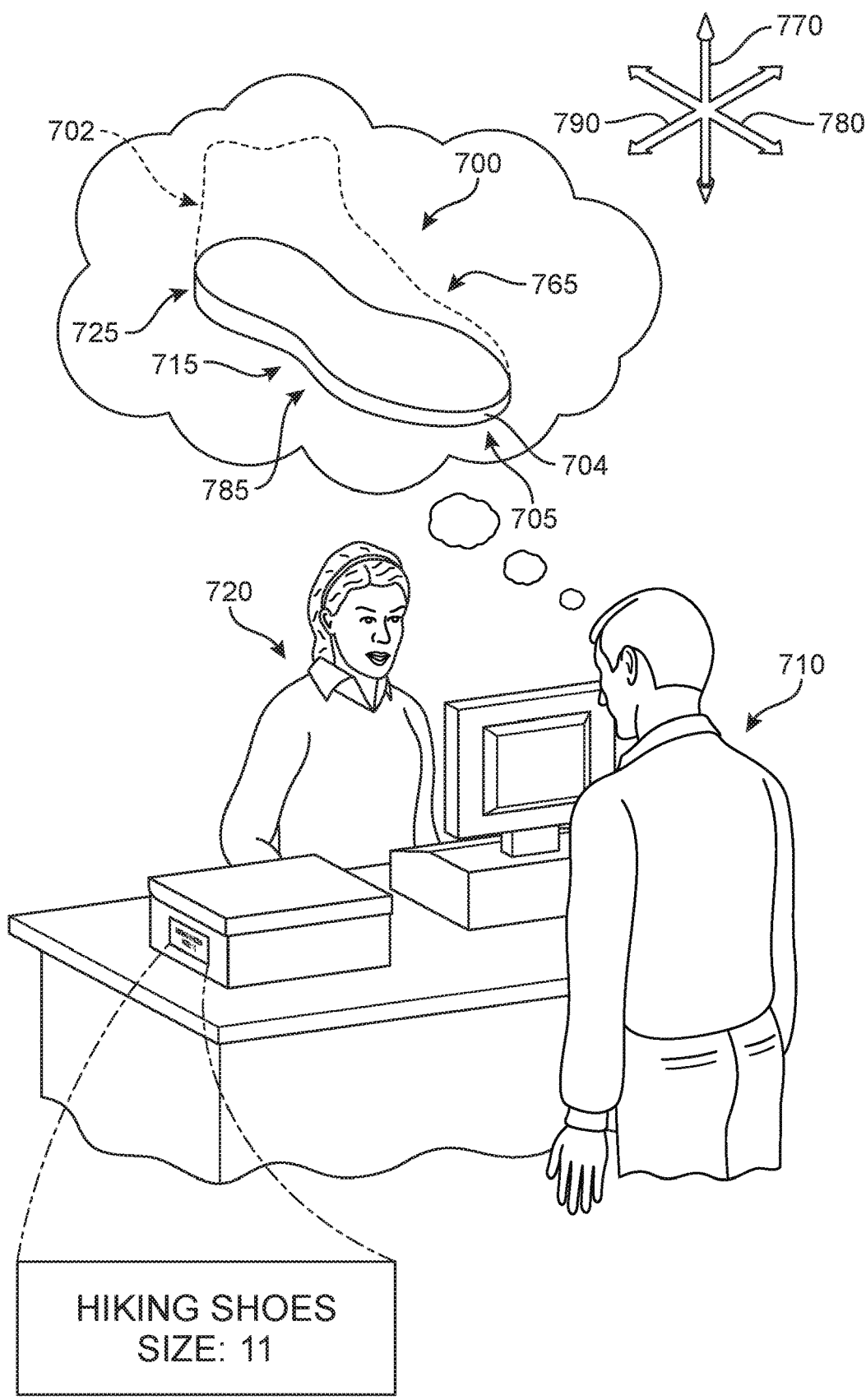
FIG. 7 is an isometric view of an embodiment of a customer and a store clerk during the purchase of a first article of footwear.

FIGS. 7-14 provide a sequence of illustrations depicting the processing cycle discussed generally above. FIG. 7 is an embodiment of a customer 710 interacting with a store clerk ("clerk") 720. The interaction may occur in a retail environment in some embodiments. It should be understood that while FIG. 7 provides one example of the purchase of a first article of footwear ("first article") 700, in other embodiments, first article 700 can be obtained by other means, such as through an online, telephone, or mail-in order, in instances where first article 700 is shipped to customer 710, or received as a gift from another person to customer 710. In other words, the use of the term "purchase" is only intended to describe the transfer of the property comprising first article 700 to a customer, and need not require the actual purchasing of the article from the retailer or manufacturer.

In the magnified view of FIG. 7, it can be seen that first article 700 includes a first sole member 704 exposed by a dotted line representation of an upper 702. As noted above, for consistency and convenience, directional adjectives are employed throughout this detailed description. Thus, first article 700 (and other articles in this description) may be divided into three general regions along a longitudinal axis 780: a forefoot region 705, a midfoot region 715, and a heel region 725. Forefoot region 705 generally includes portions of first article 700 corresponding with the toes and the joints connecting the metatarsals with the phalanges. Midfoot region 715 generally includes portions of first article 700 corresponding with an arch area of the foot. Heel region 725 generally corresponds with rear portions of the foot, including the calcaneus bone. Forefoot region 705, midfoot region 715, and heel region 725 are not intended to demarcate precise areas of first article 700. Rather, forefoot region 705, midfoot region 715, and heel region 725 are intended to represent general relative areas of first article 700 to aid in the following discussion. Since various features of first article 700 extend beyond one region of first article 700, the terms forefoot region 705, midfoot region 715, and heel region 725 apply not only to first article 700 but also to the various features of first article 700, as well as other articles of footwear described herein.

In addition, referring to FIG. 7, for reference purposes, a lateral axis 790 of first article 700, and any components related to first article 700, may extend between a medial side 765 and a lateral side 785 of the foot. Additionally, in some embodiments, longitudinal axis 780 may extend from forefoot region 705 to heel region 725. It will be understood that each of these directional adjectives may also be applied to individual components of an article of footwear, such as an upper and/or a sole member. In addition, a vertical axis 770 refers to the axis perpendicular to a horizontal surface defined by longitudinal axis 780 and lateral axis 790.

As noted above, first article 700 may include upper 702 and sole member 704.

Generally, upper 702 may be any type of upper. In particular, upper 702 may have any design, shape, size and/or color. For example, in embodiments where first article 700 is a basketball shoe, upper 702 could be a high-top upper that is shaped to provide high support on an ankle. In embodiments where first article 700 is a running shoe, upper 702 could be a low-top upper.

As shown in FIG. 7, upper 702 may include one or more material elements (for example, meshes, textiles, foam, leather, and synthetic leather), which may be joined to define an interior void configured to receive a foot of a wearer. The material elements may be selected and arranged to impart properties such as light weight, durability, air permeability, wear resistance, flexibility, and comfort. Upper 702 may define an opening through which a foot of a wearer may be received into the interior void.

First sole member 704 may be incorporated into a sole structure (not shown) in some embodiments. In one embodiment, a sole structure may primarily comprise first sole member 704. In different embodiments, a sole structure may include different components. For example, the sole structure may include an outsole, a midsole, a cushioning layer, and/or an insole. In addition, in some cases, a sole structure can include one or more cleat members or traction elements that are configured to increase traction with a ground surface.

In some embodiments, the sole structure may include multiple components, which may individually or collectively provide first article 700 with a number of attributes, such as support, rigidity, flexibility, stability, cushioning, comfort, reduced weight, or other attributes. In some embodiments, the sole structure may include an insole/sockliner, a midsole, and a ground-contacting outer sole member ("outsole"), which may have an exposed, ground-contacting lower surface. In some cases, however, one or more of these components may be omitted. In one embodiment, first sole member 704 may comprise the entirety or substantial entirety of the sole structure, as described herein.

At least a portion of the sole structure may be fixedly attached to upper 702 (for example, with adhesive, stitching, welding, or other suitable techniques) and may have a configuration that extends between upper 702 and the ground. The sole structure may include provisions for attenuating ground reaction forces (that is, cushioning and stabilizing the foot during vertical and horizontal loading). In addition, the sole structure may be configured to provide traction, impart stability, and control or limit various foot motions, such as pronation, supination, or other motions.

In some embodiments, the sole structure may be configured to provide traction for first article 700. In addition to providing traction, the sole structure may attenuate ground reaction forces when compressed between the foot and the ground during walking, running, or other ambulatory activities. The configuration of the sole structure and/or first sole member 704 may vary significantly in different embodiments to include a variety of conventional or non-conventional structures. In some cases, the configuration of first sole member 704 or other components of the sole structure can be configured according to one or more types of ground surfaces on which the sole structure may be used.

For example, the disclosed concepts may be applicable to footwear configured for use on any of a variety of surfaces, including indoor surfaces or outdoor surfaces. The configuration of first sole member 704 may vary based on the properties and conditions of the surfaces on which first article 700 is anticipated to be used. In some cases, first sole member 704 may vary depending on whether the surface is hard or soft. In addition, the sole structure may be tailored for use in wet or dry conditions. In some other embodiments, the sole structure may be configured for a particularly specialized surface or condition. The proposed footwear upper construction may be applicable to any kind of footwear, such as basketball, soccer, football, and other athletic activities. Accordingly, in some embodiments, the sole structure may be configured to provide traction and stability on hard indoor surfaces (such as hardwood), soft, natural turf surfaces, or on hard, artificial turf surfaces. In some embodiments, the sole structure may be configured for use on multiple different surfaces.

In FIG. 7, it can be seen that first sole member 704 comprises a substantially continuous material, such that no apertures are present (similar to first sole member 115 of FIG. 1). The heel cushioning level of first sole member 704 may be understood to be associated with a "medium" or intermediate level of cushioning by a manufacturer for this example. In addition, for purposes of illustration described herein, it can be understood that first sole member 704 is associated with what will be referred to as a first level of heel cushioning. However, the phrase "first level" should not be understood to limit the customer's purchase to a specific magnitude of heel cushioning, as a customer may initially purchase an article with any degree or type of heel cushioning. Thus, first level in this description is used to generally identify and label the degree of cushioning of the first article of footwear and differentiate its heel cushioning from the heel cushioning of a subsequent article of footwear.

Figure 8:
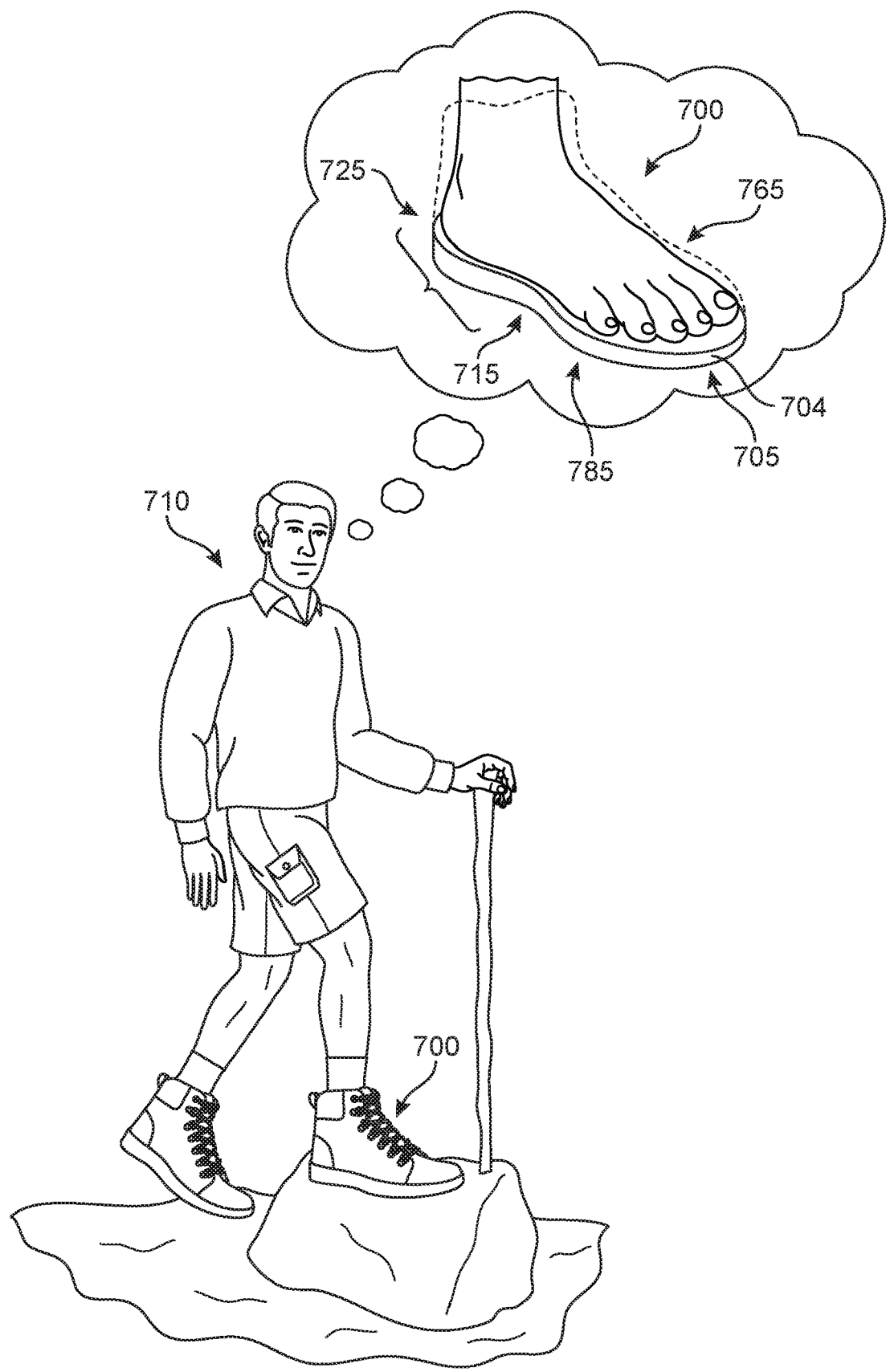
FIG. 8 is an isometric view of an embodiment of a customer wearing the first article of footwear.

In some embodiments, upon receipt of first article 700, customer 710 may wear first article 700. As discussed above, in different embodiments, customer 710 may use first article 700 in a variety of environments or activities. Referring to FIG. 8, customer 710 is shown hiking while wearing first article 700. During this activity, in some embodiments, customer 710 may assess and/or evaluate the heel cushioning provided by first sole member 704. Over a period of time, customer 710 may form a sense of how he or she feels regarding the level of heel cushioning, and his or her overall comfort with the initial level. It should be understood that in other embodiments a customer can engage in a variety of different activities, and the evaluation of the heel cushioning can be made during any of these activities.

Figure 9:
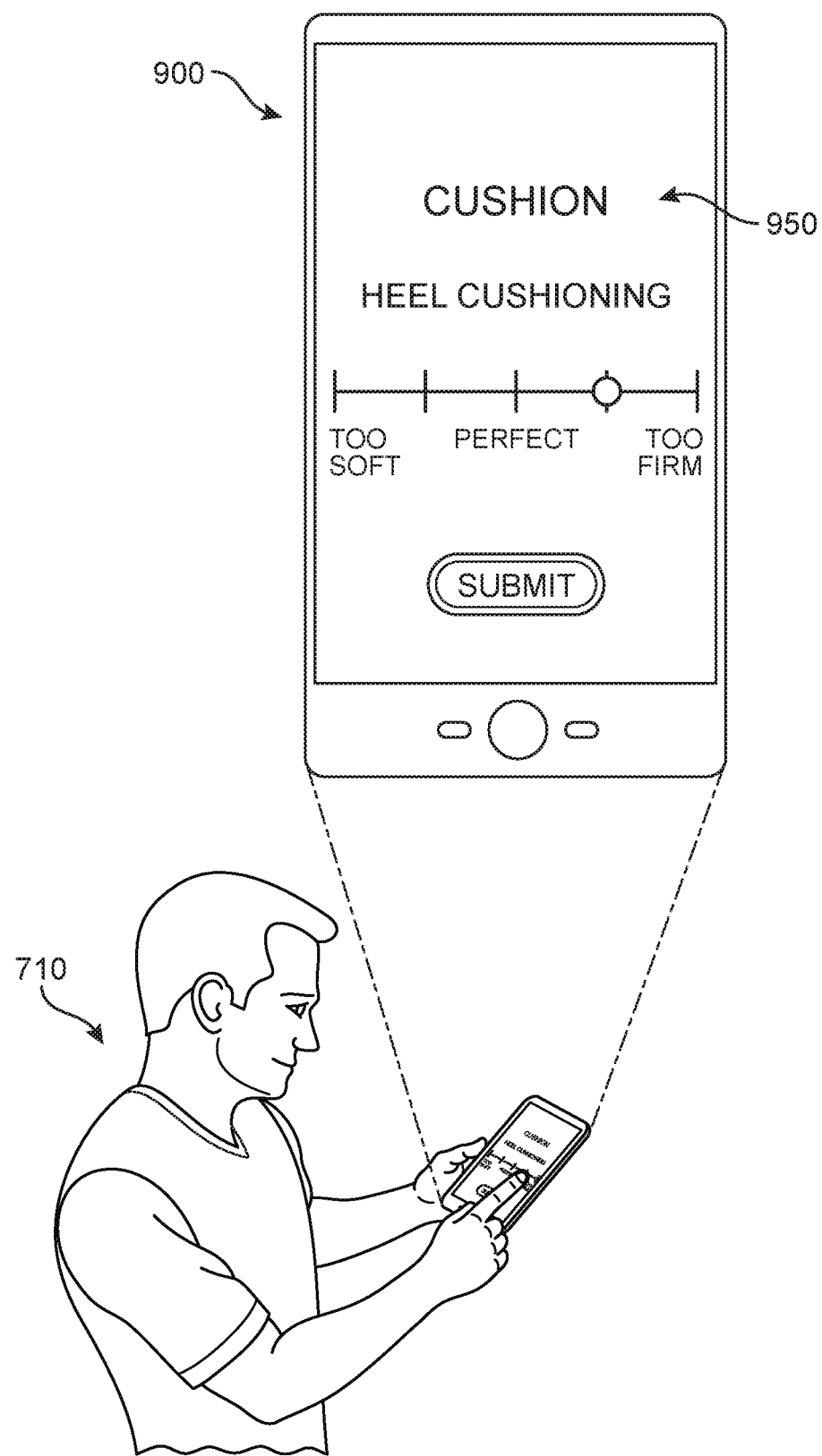
FIG. 9 is a schematic representation of an embodiment of a customer entering a rating for the heel cushioning of the first article of footwear.

In some embodiments, a manufacturer or another source may provide a customer with a means of submitting his or her feedback regarding the heel cushioning of first article 700 to the manufacturer. FIG. 9 shows an embodiment of customer 710 during use of an application 950 on a mobile device 900. In some embodiments, application 950 can comprise a rating system for evaluating the first level of heel cushioning associated with the first article. In one embodiment, interaction with application 950 by customer 710 allows customer 710 to enter and/or select an assessment value corresponding to his or her evaluation of the first level of heel cushioning and submit it into application 950. In FIG. 9, application 950 requests customer 710 rate the heel cushioning on a sliding scale ranging between "too soft" at one end and "too firm" at the opposite end. In one embodiment, the center of the scale—if selected by a customer—can represent a "perfect" or optimal heel-cushioning rating, such that no change may be desired by the customer. In some embodiments, if a customer chooses "perfect," the subsequent article of footwear provided can have a sole member with a substantially similar level of heel cushioning.

It should be understood that the format, presentation, and other parameters (including the specific query posed to the customer) of the rating system may differ from that shown here in different embodiments. In addition, in other embodiments, the rating system may be provided to the user in different ways. For example, a user may be provided with a rating system via e-mail, a web browser, text (SMS), postal mail, at a retail store, or over the telephone, or other means.

Furthermore, it should be understood that, in some embodiments, the evaluation process can occur one or more times, and over any interval or time period. In some embodiments, a customer may evaluate a pair of footwear after a single use (e.g., a single run or a single sporting practice). In other embodiments, however, a customer may use the footwear many times before deciding on a final evaluation. For example, since some articles require a period of days to weeks of use to be fully "broken in," it may be beneficial for a customer to wait a predetermined period of time (or number of uses) before deciding on an evaluation. Moreover, in some cases, an evaluation system may be configured such that a customer is encouraged to submit multiple evaluations over time, thereby providing a more statistically robust measurement of the evaluation or rating. It can also be appreciated that in some embodiments, a customer could wait to provide an evaluation until he or she is about to place an order for a new pair of footwear. Thus, the feedback provided in the exemplary customization system can be one-time feedback or ongoing, and can occur throughout any time in the lifetime of the footwear.

In the example of FIG. 9, customer 710 is shown rating the first level of heel cushioning as being firmer (i.e., stiffer) than they would like or prefer. Once the assessment is completed, the rating may be submitted to the manufacturer, or another source that can inform the manufacturer of the data. In some embodiments, the manufacturer may request that customer 710 provide the customer-selected rating of the first level of heel cushioning to the manufacturer.

Figure 10:
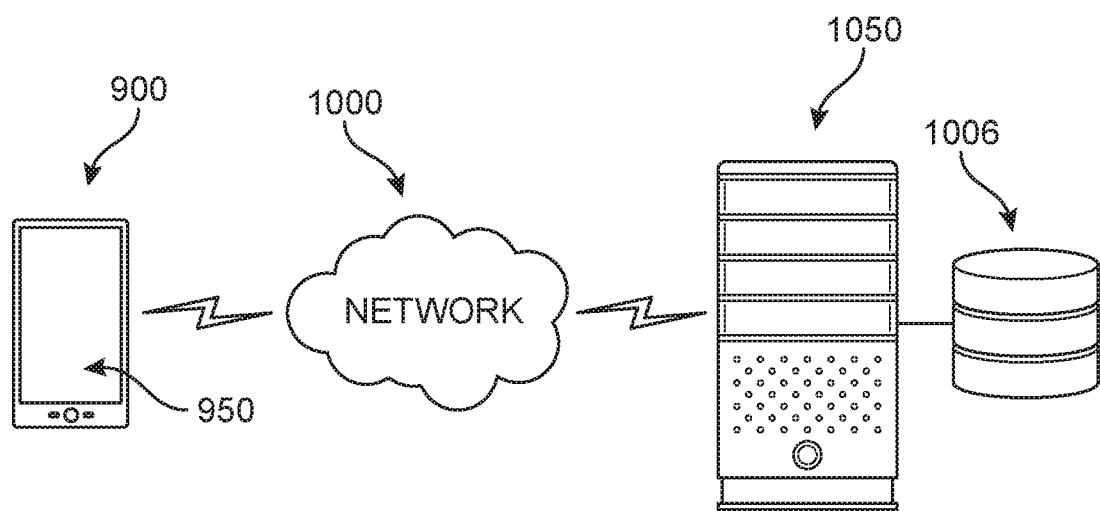
FIG. 10 is a schematic representation of an embodiment of the submission of a customer rating for the heel cushioning to a manufacturer.

FIG. 10 is a schematic view of some components of a customization system, according to an embodiment. Specifically, FIG. 10 includes various systems and devices that may be used to transmit and/or receive evaluation information as well as systems and devices for storing evaluations to be used in manufacturing customized articles.

Referring to FIG. 10, a server 1050 may communicate with a mobile device 900 over a network 1000. Server 1050 may provide information to, and/or receive information from, mobile device 900. In some embodiments, for example, evaluation information, such as a customer-selected evaluation, may be transmitted by mobile device 900 to server 1050 over network 1000. Upon receiving the evaluation information, server 1050 may store some or all of the information in database 1006. In particular, the evaluation information could be stored in one or more tables associated with a particular set of customer identification information. Furthermore, a manufacturer may access information in a database, such as evaluation information, when preparing to manufacture a new article of footwear for a customer that has provided the evaluation information and placed an order for a new pair of footwear.

In one embodiment, a manufacturer may receive an alert when feedback is received from a customer pertaining to the heel-cushioning level. However, in other embodiments, the information may be transferred from the customer to the manufacturer through a variety of methods, such as via e-mail, a web browser submission form, texting (SMS), postal mail, at a retail store, or over the telephone, or other means.

Both server 1050 and mobile device 900 may be considered more broadly as general "computing systems." Generally, the term "computing system" refers to the computing resources of a single computer, a portion of the computing resources of a single computer, and/or two or more computers in communication with one another.

Any of these resources can be operated by one or more human users. In some embodiments, a computing system may include one or more servers. Computing systems may include a microprocessor, RAM, ROM, and software. Both current and electronically stored signals may be processed by a central processing unit (CPU) in accordance with software stored in an electronic memory, such as ROM. A computing system can also include one or more storage devices including, but are not limited to, magnetic, optical, magneto-optical, and/or memory, including volatile memory and non-volatile memory.

Network 1000 may include any wired or wireless provisions that facilitate the exchange of information between mobile device 900 and server 1050. In some embodiments, network 1000 may further include various components such as network interface controllers, repeaters, hubs, bridges, switches, routers, modems and firewalls. In some cases, network 1000 may be a wireless network that facilitates wireless communication between two or more systems, devices, and/or components of a customization system. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 1000 could be a wired network including networks whose signals are facilitated by twister pair wires, coaxial cables, and optical fibers. In still other cases, a combination of wired and wireless networks and/or connections could be used.

Mobile computing devices can include, but are not limited to, smartphones and other cell phones, PDAs, tablets, laptops as well as possibly other devices. In some cases, mobile computing devices can run applications (or "apps") that operate natively on the computing device. In other cases, an application could be a web application configured to be run through a browser of a mobile computing device. In still other embodiments, an evaluation system could be run on a desktop computer or other non-mobile computing device. Such systems could run native applications or web applications using a browser.

In some embodiments, a customization system that includes various provisions for conducting a customization cycle or process may also include applications and user interfaces that allow for browsing, ordering, and purchasing articles of footwear independently from the evaluation process. Thus, for example, some embodiments of a customization system may include the resources (hardware and software) required to run and maintain a manufacturer's online store. In other embodiments, such provisions may be considered as separate from the customization system.

Figure 11:
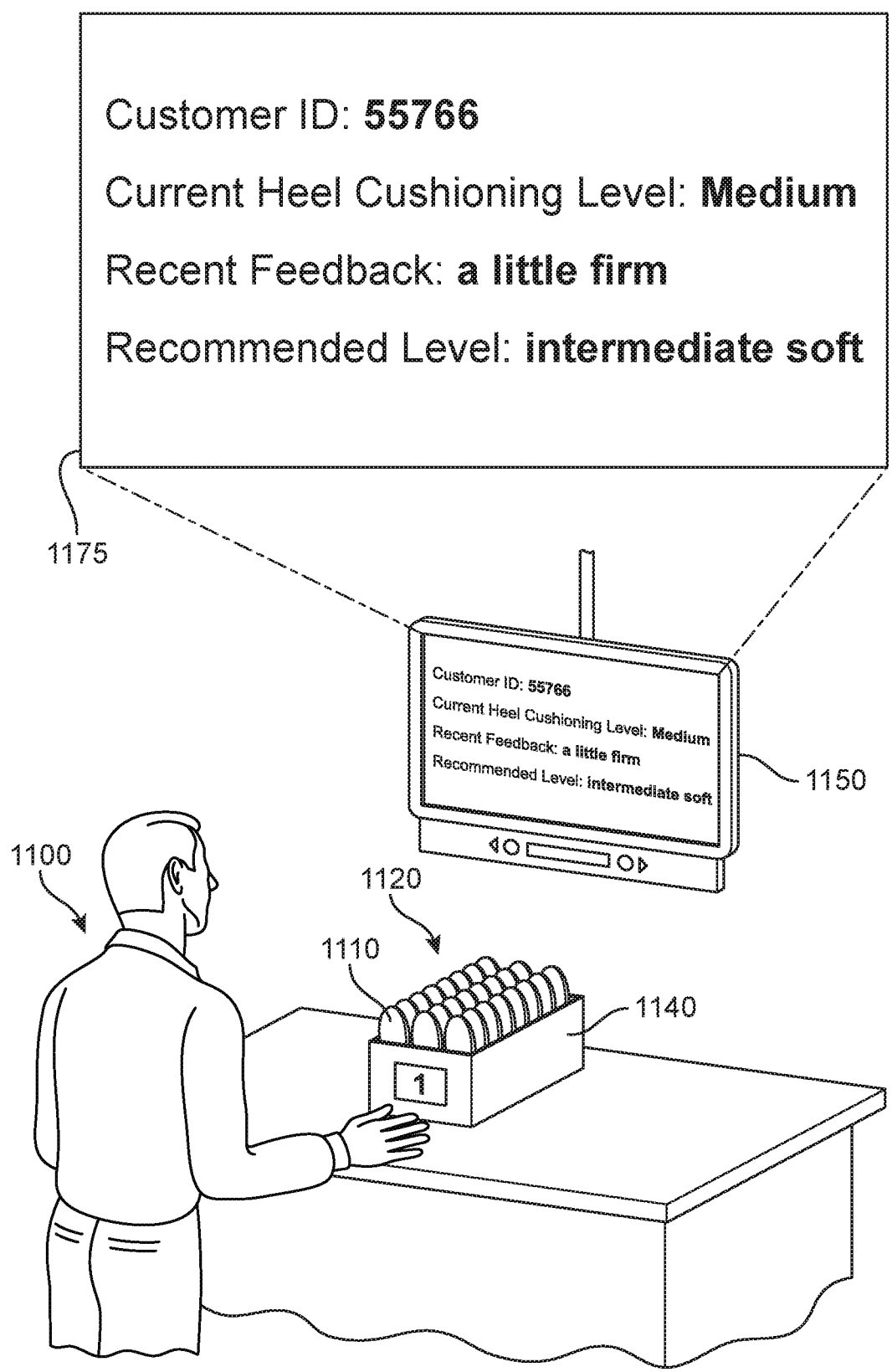
FIG. 11 is an isometric view of an embodiment of a manufacturer's selection of a new base sole layer.

Once feedback representing the customer-selected rating of the first level of heel cushioning is received by the manufacturer, the information can be used to prepare and/or provide a new article of footwear to the customer in some embodiments. In FIG. 11, an employee 1100 is reviewing the customer selected rating on a screen 1150. Screen 1150 presents a customer record 1175 that contains several categories of information, including the customer ID that is linked to the information, the current level of heel cushioning (with respect to first article 700 of FIG. 7), and the feedback by the customer (as discussed in FIG. 9). In some embodiments, the system may produce a recommended level of heel cushioning to employee 1100. However, in other embodiments, one or more categories depicted herein may be omitted, or there may be additional information included.

Furthermore, in FIG. 11, employee 1100 is shown selecting a second base sole layer 1110 from a set of base sole layers 1120. In FIG. 11, set of base sole layers 1120 are arranged in four bins 1140. However, in other embodiments, a base sole layer or set of base sole layers 1120 can be stored or supplied to the manufacturer in any manner known in the art. For purposes of clarity, with respect to the use of terms such as "first" or "second" or "third" base sole layers, in embodiments where first article 700 of FIGS. 7 and 8 includes first sole member 704, first sole member 704 may be understood to have been manufactured or originated as a "first base sole layer." Thus, in one embodiment, first base sole layer and second base sole layer 1110 may be substantially similar. However, in other embodiments, first sole member 704 may have been manufactured through a process different from that described herein with respect to the manufacture of a second sole member, or comprise different materials. It should further be understood that in other embodiments, one or more steps described herein can be automated. For example, the depiction of employee 1100 in FIG. 11 is for illustrative purposes only, and the selection of a base sole layer may occur in other ways.

Once second base sole layer 1110 is selected, a manufacturer may modify or adjust the cushioning characteristics of second base sole layer 1110. Thus, in different embodiments, the recommended cushioning level for the next article (as mentioned in FIG. 11) may trigger one or more events. As described in the flow chart of FIG. 5, in one embodiment, a cushioning profile may be generated, and an aperture profile corresponding to the cushioning profile can be produced.

Once the instructions have been prepared in accordance with the desired aperture design, a particular aperture pattern may be formed on second base sole layer 1110. In some embodiments, the heel-cushioning modifications may include regions of second base sole layer 1110 with one or more apertures 150 disposed along different portions of second base sole layer 1110. In some embodiments, apertures can be created in a base sole layer using any known methods of cutting or drilling. For example, in one embodiment, shown in FIG. 12, apertures can be created using laser cutting techniques. Specifically, in some cases, a laser can be used to remove material from a base sole layer in a manner that forms apertures in the sole member. In another embodiment, a hot knife process could be used for forming apertures in a base sole layer. Examples of methods for forming apertures on a base sole layer are disclosed in McDonald, U.S. Pat. No. 7,607,241, issued Oct. 27, 2009, titled "Article of Footwear with an Articulated Sole Structure," (previously U.S. patent application Ser. No. 11/869,604, filed Oct. 9, 2007), the entirety of which is hereby incorporated by reference.

In other embodiments, however, any other type of cutting method can be used for forming apertures. Furthermore, in some cases, two or more different techniques can be used for forming apertures. As an example, in another embodiment, apertures disposed on a side surface of a base sole layer can be formed using laser cutting, while apertures on a lower surface of the base sole layer could be formed during a molding process. Still further, different types of techniques could be used according to the material used for a base sole layer. For example, laser cutting may be used in cases where the base sole layer is made of a foam material.

Figure 12:
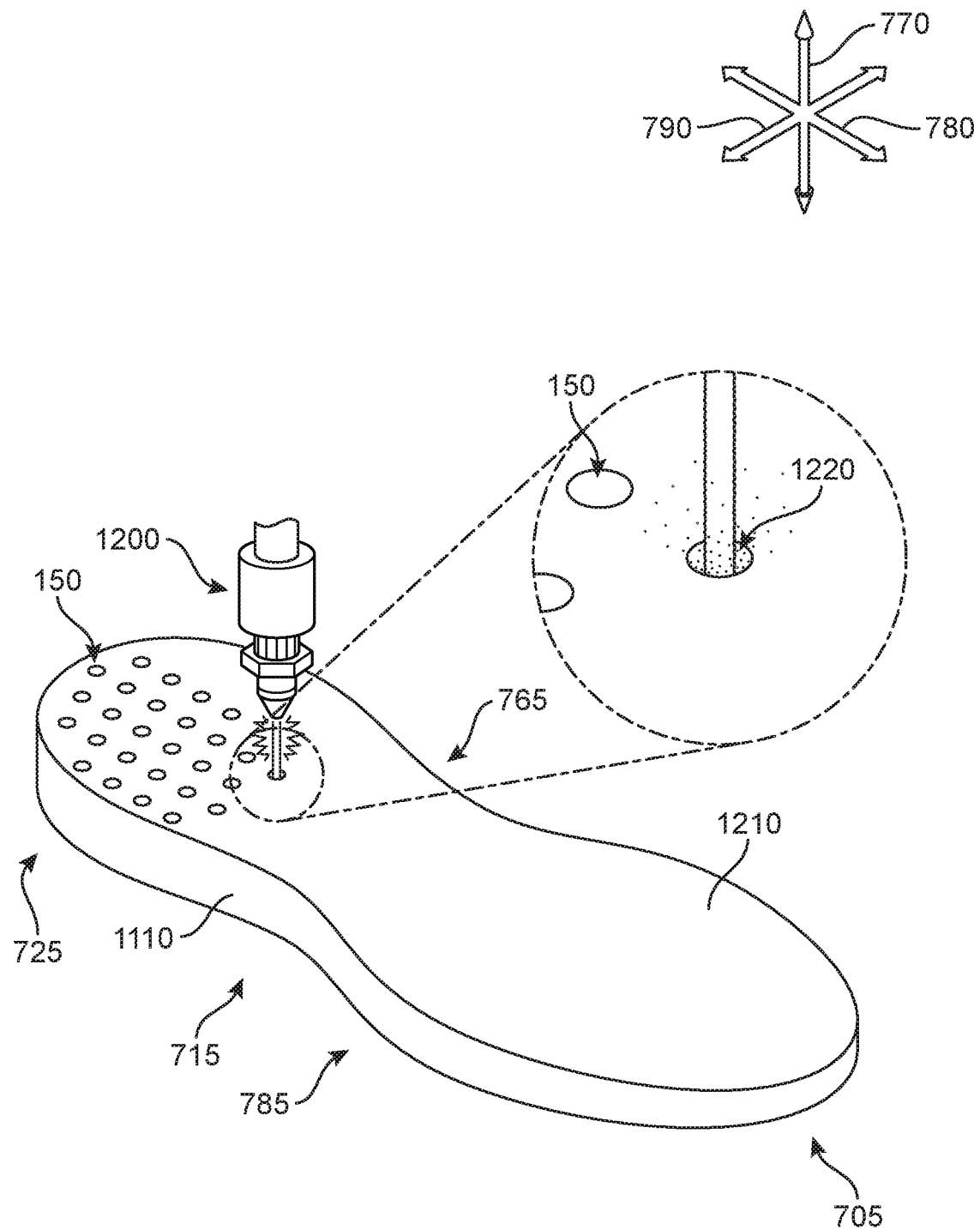
FIG. 12 is an isometric top view of an embodiment of a base sole layer during the process of forming apertures.

FIG. 12 depicts an example of the formation of a second sole member through the drilling of second base sole layer 1110. Referring to FIG. 12, one or more apertures can be applied to or formed in second base sole layer 1110 using a laser drill 1200. In other cases, there may be a greater number of laser drills. In FIG. 12, laser drill 1200 has begun to engage the material of second base sole layer 1110, and an initial plurality of apertures 150 have been formed along an external, upper surface 1210 of heel region 725. Each aperture can be associated with an opening 1220 along upper surface 1210. Although only apertures in one general region are shown in this example, it will be understood that a similar method could be used for creating apertures in any other region of second base sole layer 1110. It should further be understood that laser drill 1200 may include provisions for moving along different directions in order to direct the laser beam to the desired location. Furthermore, second base sole layer 1110 may be disposed such that it may be automatically or manually moved to receive the laser beam at the appropriate location.

It may be recalled that apertures can be formed such that they differ in one or more respects from one another, or they may be formed in a uniform manner, such that they are substantially similar in size, length, and shape. Furthermore, it should be understood that laser drills 1200 may be oriented at an angle different from those shown in FIG. 12, such that laser drill 1200 can form apertures 150 oriented in a diagonal or non-parallel manner with respect to vertical axis 770, longitudinal axis 780, and/or lateral axis 790. In some embodiments, once all of the apertures 150 corresponding to the aperture pattern for the specified cushioning level have been formed in second base sole layer 1110, it may be understood that a second sole member 1304 has been manufactured (shown in FIG. 13).

Thus, as described herein, in some embodiments, the arrangement of apertures on a sole member could be varied to tune properties of the sole member for specific types of cushioning characteristics. For example, in some cases, the arrangement of apertures on a sole member could be selected according to the degree of cushioning for which the article of footwear is intended. In some embodiments, a manufacturer could vary the arrangement of apertures for various types of footwear including, but not limited to, soccer footwear, running footwear, cross-training footwear, basketball footwear, as well as other types of footwear, while providing a specified degree of cushioning. Additionally, in other embodiments, the arrangement of apertures on a sole member could be varied according to the gender of the intended user. For example, in some cases, the aperture arrangements may vary between footwear for men and footwear for women, if so instructed by a customer. Still further, in some embodiments, the arrangement of apertures on a sole member could be varied according to preferences of a user for achieving desired performance effects, if so instructed by a customer. As an example, a desire for increased flexibility on a lateral side of the article by a customer can be accommodated by increasing the number and/or size of apertures on the lateral side of the sole member.

As a result of the inclusion of different possible configurations of apertures 150, a sole member may have varying responsiveness to forces, and be rated at different cushioning levels. In other words, apertures 150 can be disposed in a pattern that can help attenuate ground reaction forces and absorb energy, imparting different cushioning characteristics to the sole member.

Figure 13:
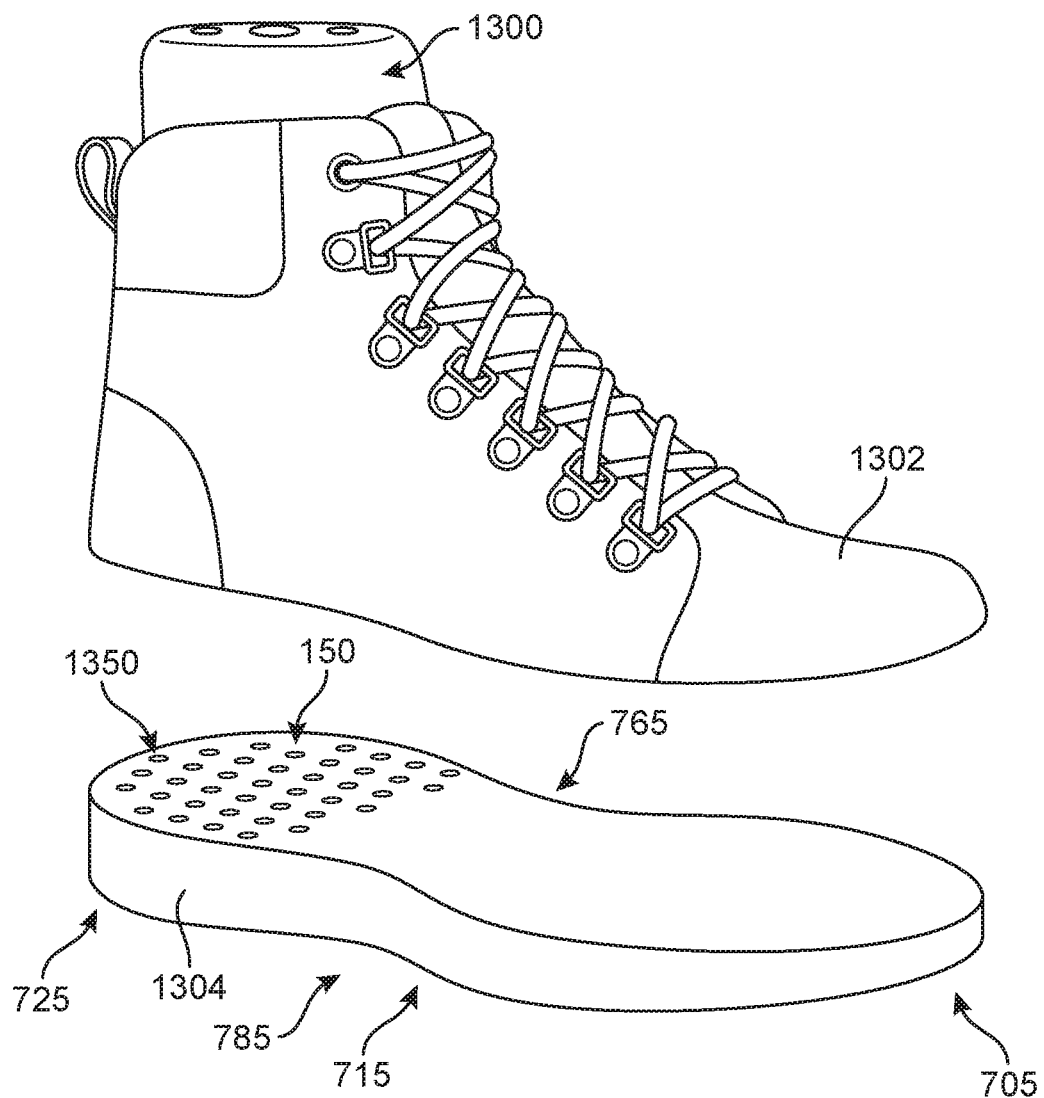
FIG. 13 is an isometric view of an embodiment of an upper and sole member being assembled on a last.
Figure 14:
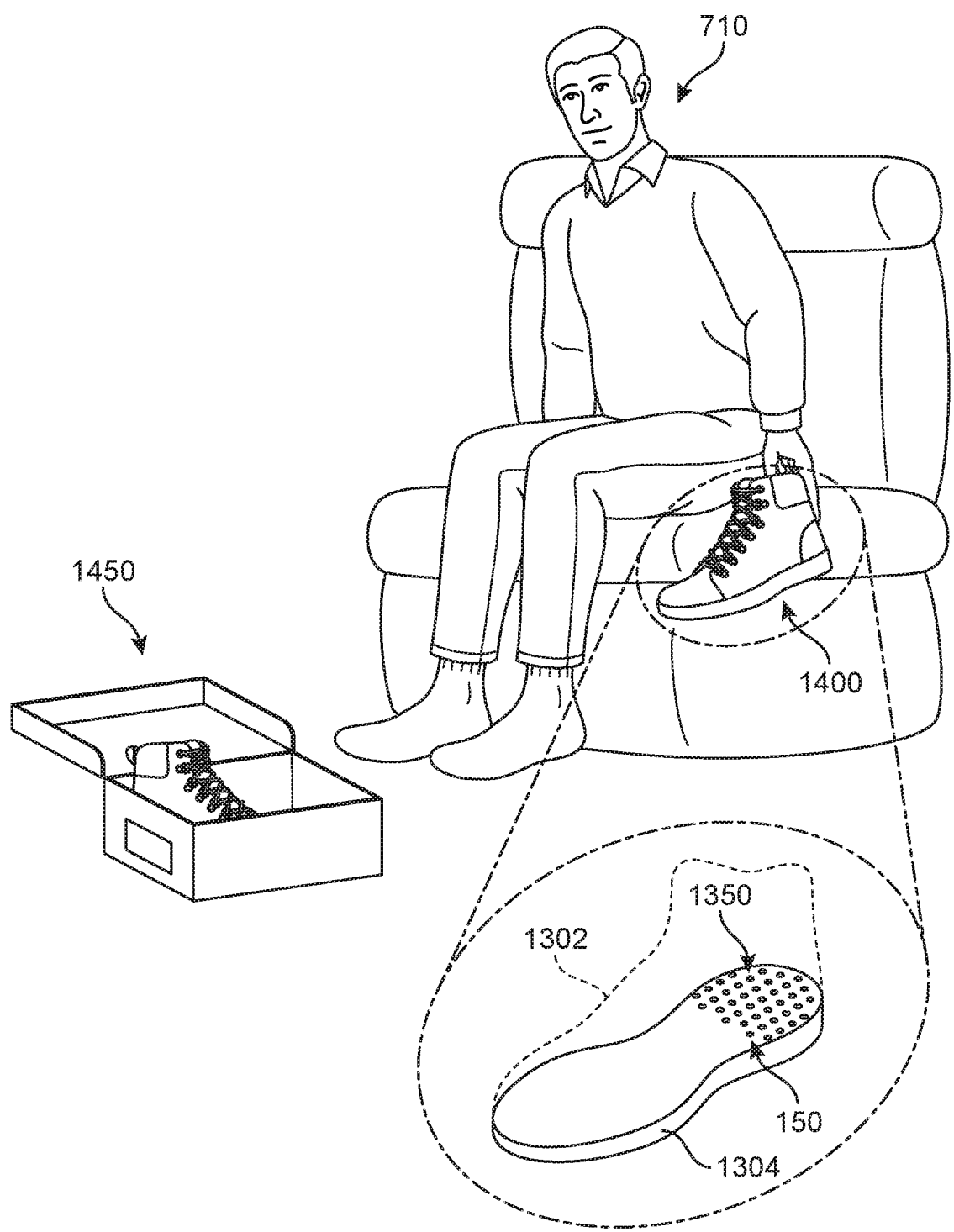
FIG. 14 is an isometric view of an embodiment of a customer receiving a second article of footwear.

FIG. 13 illustrates an embodiment of a process of assembling an upper 1302 with a second sole member 1304 to manufacture a second article of footwear (see FIG. 14). Second sole member 1304 includes a first pattern of apertures ("first pattern") 1350 formed along heel region 725. In some embodiments, first pattern 1350 corresponds to a second level of heel cushioning that is associated with second sole member 1304. The second level of heel cushioning is identified as a means of distinguishing the cushioning relative to first sole member 704 (see FIG. 7), which, for purposes of illustration, was associated with a first level of heel cushioning. Thus, second level of heel cushioning has a value that is different from the value associated with the first level of heel cushioning. In one embodiment, the second level of heel cushioning is softer than the first level of heel cushioning. In some embodiments, first pattern 1350 modifies the second base sole layer to provide a sole member that has a softer level of cushioning relative to first sole member 704 (see FIG. 7).

It should be noted that the various degrees of cushioning described and shown here are for purposes of illustration. In some situations, the sole member may exhibit a greater or lesser degree of cushioning in the assembled article of footwear, depending on various factors such as the materials used in the production of the sole member, as well as its incorporation in other objects or articles. For example, if a sole member is joined or attached to a less reactive material, the compressive and/or expansive properties associated with the sole member may differ, or be limited. In some embodiments, when the sole member is joined to a strobel or other structure, the capacity of expansion or deformation may decrease, for example.

Furthermore, articles of the embodiments discussed above may be made from materials known in the art for making articles of footwear. For example, a sole member may be made from any suitable material including, but not limited to, elastomers, siloxanes, natural rubber, other synthetic rubbers, aluminum, steel, natural leather, synthetic leather, foams, or plastics. In one embodiment, materials for a sole member can be selected to enhance the overall flexibility, fit, and stability of the article. In one embodiment, a foam material can be used with a sole member, as foam can provide the desired elasticity and strength. In another embodiment, a rubber material could be used to make a midsole of a sole member. In still another embodiment, a thermoplastic material could be used with a sole member. For example, in one embodiment, thermoplastic polyurethane (TPU) may be used to make a midsole for a sole member. In still other embodiments, a sole member may comprise a multi-density insert that comprises at least two regions of differing densities. For example, in one other embodiment, a midsole of a sole member could be configured to receive one or more inserts.

It should be understood that while only upper 1302 and second sole member 1304 are identified in FIG. 13, the assembled article of footwear can include any other components associated with footwear including, but not limited to, a midsole, insole, outsole, or other individual elements associated with footwear. In addition, while a last 1300 is illustrated in FIG. 13, any other kind of assembling device may be used including, but not limited to, a mold, a foundational element, a cast, or other such devices and/or pieces. Thus, as shown herein, second sole member 1304 is fixedly attached to upper 1302.

Once assembled, upper 1302 and second sole member 1304 may be provided to customer 710 in the form of a second article of footwear ("second article") 1400, shown in FIG. 14. FIG. 14 depicts an embodiment of customer 710 with a pair of footwear 1450 that includes second article 1400. Similar to first article 700, second article 1400 can be obtained in a variety of ways, such as in a retail store, or through an online, telephone, or mail-in order (in instances where second article 1400 is shipped to customer 710), or where second article 1400 is received as a gift from another person to customer 710. In the magnified view of FIG. 14, it can be seen that second article 1400 includes second sole member 1304 with first pattern 1350, exposed by a dotted line representation of an upper 1302. The heel-cushioning level of second sole member 1304 may be understood to be semi-soft or "intermediate soft" for this example. However, in other cases, a customer may purchase a second article with any level of heel cushioning.

In some embodiments, upon receipt of second article 1400, customer 710 may wear second article 1400. As discussed above, in different embodiments, customer 710 may use first article 700 in a variety of environments or activities. During various activities, in some embodiments, customer 710 may evaluate the heel cushioning provided by second sole member 1304. Over a period of time, customer 710 may form a sense of how he or she feels regarding the new level of heel cushioning, and assess his or her overall comfort with second article 1400. In different embodiments, a similar series of steps as described above with respect to the first article may occur. For example, customer 710 may be provided with a means of submitting his or her feedback regarding the heel cushioning of second article 1400 to the manufacturer in some embodiments. In addition, customer 710 may be asked to submit an assessment with respect to the second level of heel cushioning to the manufacturer. In some embodiments, once the feedback representing the customer-selected rating of the second level of heel cushioning is received by the manufacturer, the information can be used to prepare and/or provide a new article of footwear to the customer. A third base sole layer can be selected that will be modified to provide the customer with a third sole member. In one embodiment, the third base sole layer can be similar to the first base sole layer or second base sole layer. As detailed above, in some embodiments, the third base sole layer can be modified through the inclusion of various patterns or arrangements of apertures formed in the heel region of the base sole layer. The third sole member can be assembled with an upper to manufacture a new third article of footwear to the customer with a third level of heel cushioning. Thus, the cycle of modifying the heel cushioning as described herein may be repeated any number of times.

Figure 15:
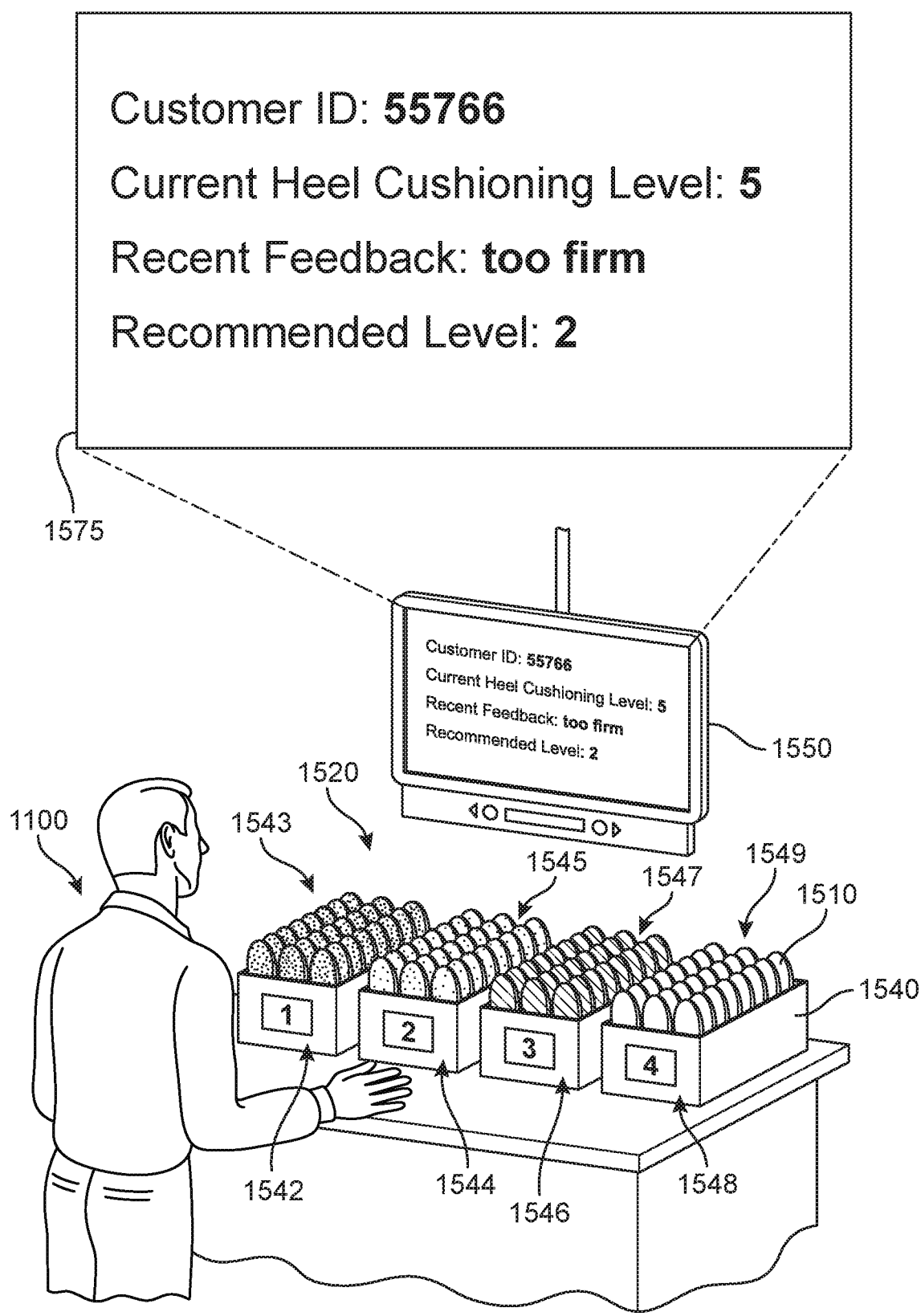
FIG. 15 is an isometric view of an embodiment of a manufacturer's selection of a new base sole layer.

In contrast to FIG. 7, in different embodiments, customer 710 can be provided a new level of heel cushioning through a specific selection of a base sole layer that includes different cushioning properties relative to the base sole layer of the previously provided article of footwear. For example, referring to FIG. 15, once the feedback representing the customer-selected rating of the first level (or subsequent levels) of heel cushioning is received by the manufacturer, the information can be used to prepare and/or provide a new article of footwear to the customer in some embodiments. In FIG. 15, employee 1100 is reviewing the customer-selected rating on a screen 1550. Screen 1550 presents a customer record 1575 that contains several categories of information to employee 1100, including the customer ID that is linked to the information, the current level of heel cushioning (here, with respect to first article 700 of FIG. 7, identified by the numeral "5"), and the feedback by the customer (as discussed in FIG. 9), shown here as "too firm". In some embodiments, the system may produce a recommended level of heel cushioning to employee 1100, which in this case is identified as "2". However, in other embodiments, one or more categories depicted herein may be omitted, or there may be additional information included. Thus, in different embodiments, there may be various ways of describing the level of heel cushioning. For example, while numbers are used to rate or categorize the cushioning characteristics in FIG. 15, phrases or letters (or other alphanumerics or symbols) may be used to represent the same information in different embodiments.

In FIG. 15, employee 1100 is shown as he selects a third base sole layer 1510 from a set of base sole layers 1520. In FIG. 15, set of base sole layers 1520 are arranged in four bins 1540. However, in other embodiments, a base sole layer or set of base sole layers 1520 can be stored or supplied to the manufacturer in any manner known in the art.

In addition, in the embodiment of FIG. 15, bins 1540 comprise a first bin 1542, a second bin 1544, a third bin 1546, and a fourth bin 1548. Each bin contains a plurality of base sole members and, for illustrative purposes, each bin in this embodiment represents a different grouping or assortment of base sole layers. For example, first bin 1542 includes a first group of base sole layers ("first group") 1543, second bin 1544 includes a second group of base sole layers ("second group") 1545, third bin 1546 includes a third group of base sole layers ("third group") 1547, and fourth bin 1548 includes a fourth group of base sole layers ("fourth group") 1549. In other embodiments, there may be a fewer number or greater number of base sole layer groups. In some embodiments, there may be groups or bins containing base sole layers made of materials associated with each degree of heel cushioning, for example.

In different embodiments, each base sole layer includes a heel portion. The heel portion can be understood to comprise the portion of the base sole layer located in the heel region of the base sole layer. In other words, the heel portion is integrally formed with or fixedly attached to the remainder of the base sole layer. More particularly, in some embodiments, a heel portion of each base sole layer can comprise a material that provides a specific level of heel cushioning to the base sole layer.

Thus, in some embodiments, each group of base sole layers can comprise cushioning characteristics that differ from the other groups. In FIG. 15, at least the heel portion of each base sole layer of first group 1543 is made of a first type of material(s), at least the heel portion of each base sole layer of second group 1545 is made of a second type of material(s), at least the heel portion of each base sole layer of third group 1547 is made of a third type of material(s), and at least the heel portion of each base sole layer of fourth group 1549 is made of a fourth type of material(s), where the first type, second type, third type, and fourth type of materials each differ from one another. In some embodiments, the entirety of each of the base sole layers can be made of substantially similar material(s) as the heel portion.

In different embodiments, the heel portions of the base sole layers may be formed from any suitable material having the cushioning properties described herein, and/or according to the activity for which the assembled article of footwear is intended. In some embodiments, the first type, second type, third type, or fourth type of materials may include a foamed polymer material, such as polyurethane (PU), ethyl vinyl acetate (EVA), other polymer foam materials, or any other suitable material that operates to attenuate ground reaction forces as the sole member is worn by a user during walking, running, or other ambulatory activities. In some cases, the first type, second type, third type, or fourth type of materials may include plastics, thermoplastics, foams, rubbers, composite materials, elastomeric materials, as well as any other kinds of materials. In one embodiment, the first type, second type, third type, or fourth type of materials may comprise a rubber or a rubber-coated material with a high level of grip. It will also be understood that in other embodiments, any of the first type, second type, third type, or fourth type of materials could be made of substantially different materials than those listed here.

In addition, in other embodiments, the material selected for different parts of a sole member may possess sufficient durability to withstand the repetitive compressive and bending forces that are generated during running or other athletic activities. In some embodiments, the material(s) may include polymers such as urethane or nylon; resins; metals such as aluminum, titanium, stainless steel, or lightweight alloys; or composite materials that combine carbon or glass fibers with a polymer material, ABS plastics, PLA, glass-filled polyamides, stereolithography materials (epoxy resins), silver, titanium, steel, wax, photopolymers, and polycarbonate. The customized sole member may also be formed from a single material or a combination of different materials. For example, one side of a custom sole member may be formed from a polymer whereas the opposing side may be formed from foam. In addition, specific regions may be formed from different materials depending upon the anticipated forces experienced by each region.

Furthermore, in some embodiments, each base sole layer of first group 1543, second group 1545, third group 1547, and/or fourth group 1549 may extend continuously (e.g., without breaks or gaps) through each of forefoot region, midfoot region, and heel region. In addition, in one embodiment, each base sole layer of first group 1543, second group 1545, third group 1547, and/or fourth group 1549 may extend in a substantially continuous manner between the lateral side and the medial side. In other words, in some embodiments, the base sole layers can extend in a continuous manner throughout a horizontal plane and include no apertures. Thus, the material comprising the heel portion of each base sole layer may be selected to provide the desired level of heel cushioning for the next article of footwear purchased by the customer. In FIG. 15, for example, employee 1100 can select a base sole layer from one of the bins that is associated with a level "2" heel-cushioning level.

In addition, in some other embodiments, different materials can be used with different portions of a sole. In an exemplary embodiment, portions of a sole can be filled with additional material or components to provide different types of cushioning, feel, and flexibility for a sole member. For example, in one embodiment, a core portion of a sole member may comprise a fluid-filled member, such as an air bladder. In another embodiment, one or more portions of a sole member could include hollow cavities capable of receiving fluid or other materials. In some embodiments, one or more apertures may be filled in with a different material to enhance the cushioning characteristics of the resulting sole member.

Figure 16:
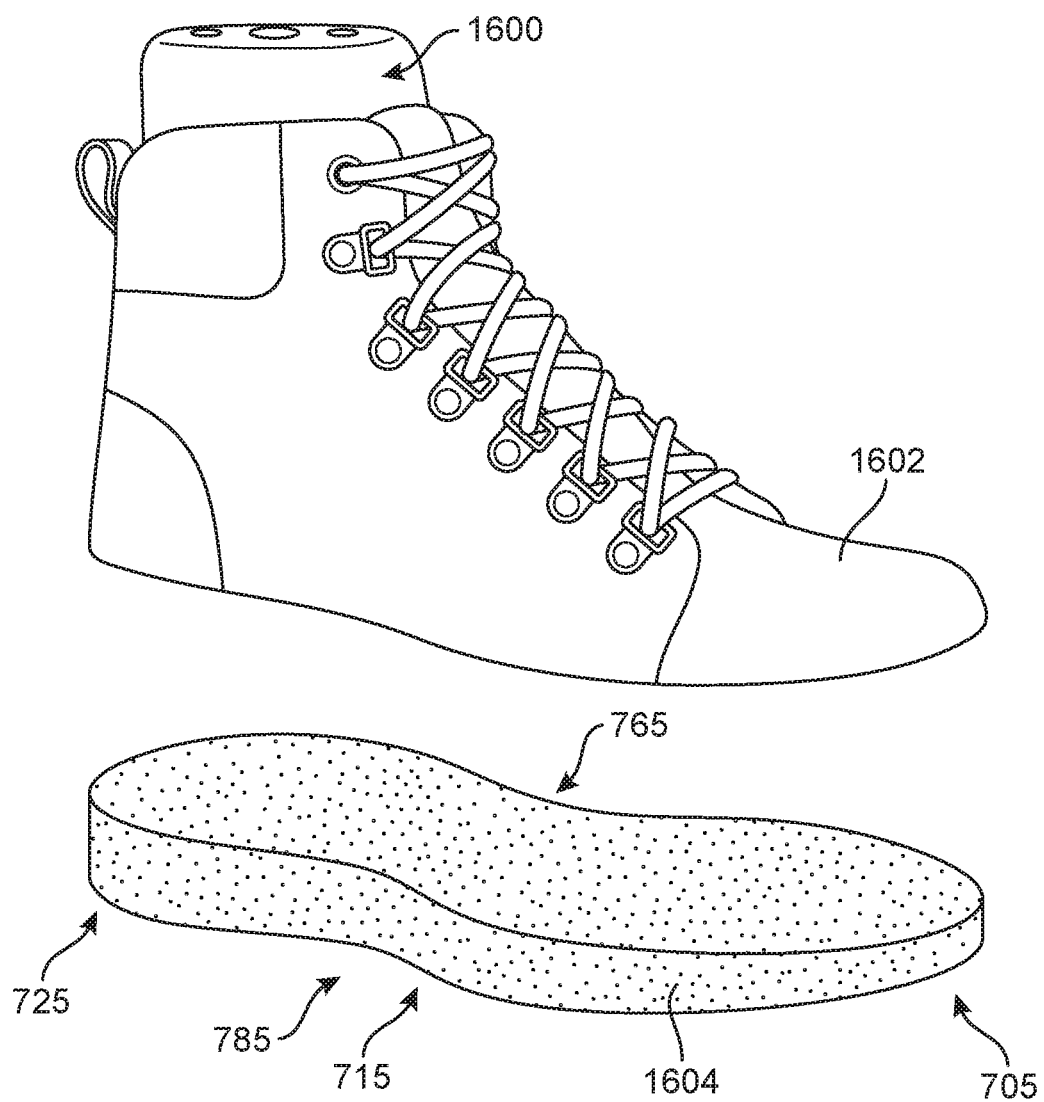
FIG. 16 is an isometric view of an embodiment of an upper and the new sole member being assembled on a last.

FIG. 16 illustrates an embodiment of a process of assembling an upper 1602 with a third sole member 1604 to manufacture a second article of footwear (see FIG. 14). Third sole member 1604 does not include apertures, in contrast to second sole member 1304 (see FIG. 13). Rather, in some embodiments, the material comprising third sole member 1604 corresponds to a third level of heel cushioning. The third level of heel cushioning is identified as a means of distinguishing the cushioning relative to first sole member 704 (see FIG. 7) which, for purposes of illustration, was associated with a first level of heel cushioning, and second sole member 1304, which was associated with a second level of heel cushioning. Thus, the third level of heel cushioning has a value that is different from the value associated with the first level of heel cushioning or the second level of heel cushioning. In one embodiment, the third level of heel cushioning is firmer or stiffer than the second level of heel cushioning, and softer than the first level of heel cushioning. In some embodiments, the material comprising the heel portion of the third base sole layer provides a sole member that has a softer level of heel cushioning relative to first sole member 704 (see FIG. 7) or second sole member 1304 (see FIG. 13). However, in other embodiments, the material comprising the third base sole layer provides a sole member that has a firmer or stiffer level of cushioning relative to first sole member 704 (see FIG. 7) or second sole member 1304 (see FIG. 13).

It should be understood that while only upper 1602 and third sole member 1604 are identified in FIG. 16, the assembled article of footwear can include any other components associated with footwear including, but not limited to, a midsole, insole, outsole, or other individual elements associated with footwear. In addition, while a last 1600 is illustrated in FIG. 16, any other kind of assembling device may be used, including a mold, a foundational element, a cast, or other such devices and/or pieces. Thus, as shown herein, third sole member 1604 is fixedly attached to upper 1602.

Furthermore, in some other embodiments, additional modifications may be made to a base sole layer to provide the desired degree of heel cushioning. In other words, while cushioning characteristics may be adjusted through either the formation of apertures (as shown in FIG. 12) or the selection of a particular material type (as shown in FIG. 15), in some embodiments, both of these techniques may be used to produce a sole member with the desired level of heel cushioning. For example, in one embodiment, a fourth base sole layer may be selected with at least the heel portion being made of a particular material type (as shown in FIG. 15), and the fourth base sole layer may then be subsequently drilled to remove portions of material in the heel region (as shown in FIG. 12). In one embodiment, the desired general cushioning characteristics may initially determine the material type of the heel portion of the base sole layer selected, while the more specific cushioning characteristics desired may determine the inclusion of a pattern of apertures in the heel portion, allowing production of a more fine-tuned customized sole member for an individual customer.

Figure 17:
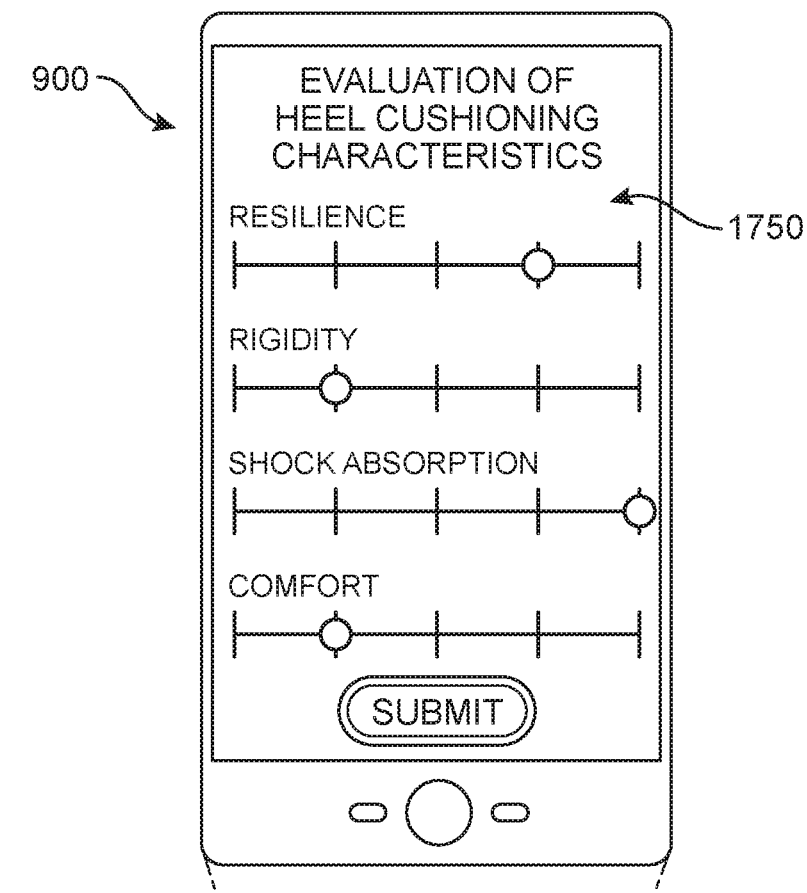
FIG. 17 is a schematic representation of an embodiment of a customer entering a rating for the heel cushioning of an article of footwear.
Figure 17:
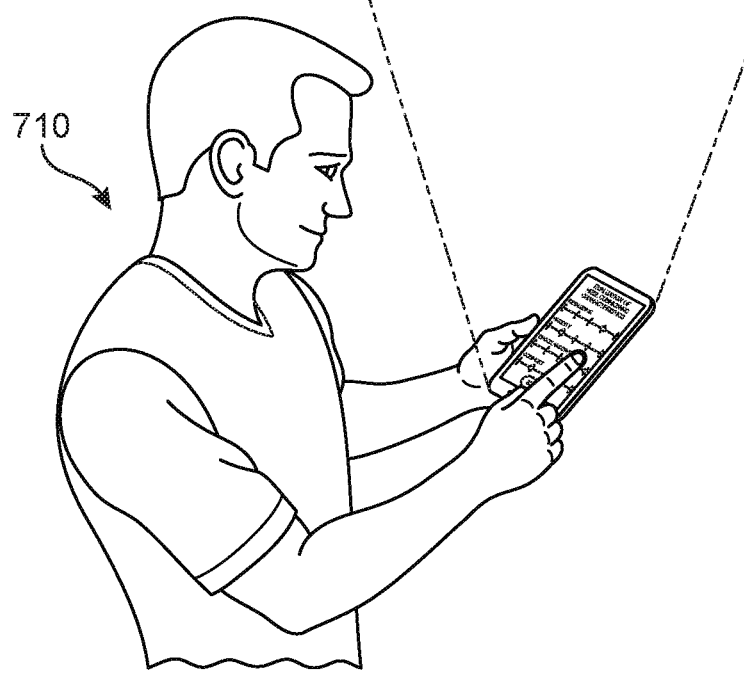

As noted above, in some embodiments, a manufacturer or another source may provide a customer with a means of submitting his or her feedback regarding the heel cushioning of the article of footwear to the manufacturer. FIG. 17 depicts an alternate embodiment of customer 710 during use of an application 1750 on mobile device 900. In some embodiments, application 1750 can comprise a rating system for evaluating the first level of heel cushioning associated with the article of footwear that differs from the rating system in FIG. 9. In one embodiment, the rating system may comprise multiple aspects of the heel-cushioning characteristics a customer may evaluate. In other words, a rating system may request the user to consider various properties of the sole member in some embodiments. In some embodiments, as shown in the example of FIG. 17, application 1750 allows customer 710 to enter and/or select an assessment value corresponding to his or her evaluation of the current level of heel cushioning as represented by properties including, but not limited to, resilience, rigidity, shock absorption, comfort, or other properties associated with the sole member. Thus, in FIG. 17, application 1750 requests customer 710 rate the heel cushioning along four different sliding scales. However, it should be understood that the format, presentation, and other parameters (including the specific query posed to the customer) of the rating system may differ from that shown here in different embodiments. In addition, in other embodiments, the rating system may be provided to the user in different ways. For example, a user may be provided with a rating system via e-mail, a web browser, text (SMS), postal mail, at a retail store, or over the telephone.

Figure 18:
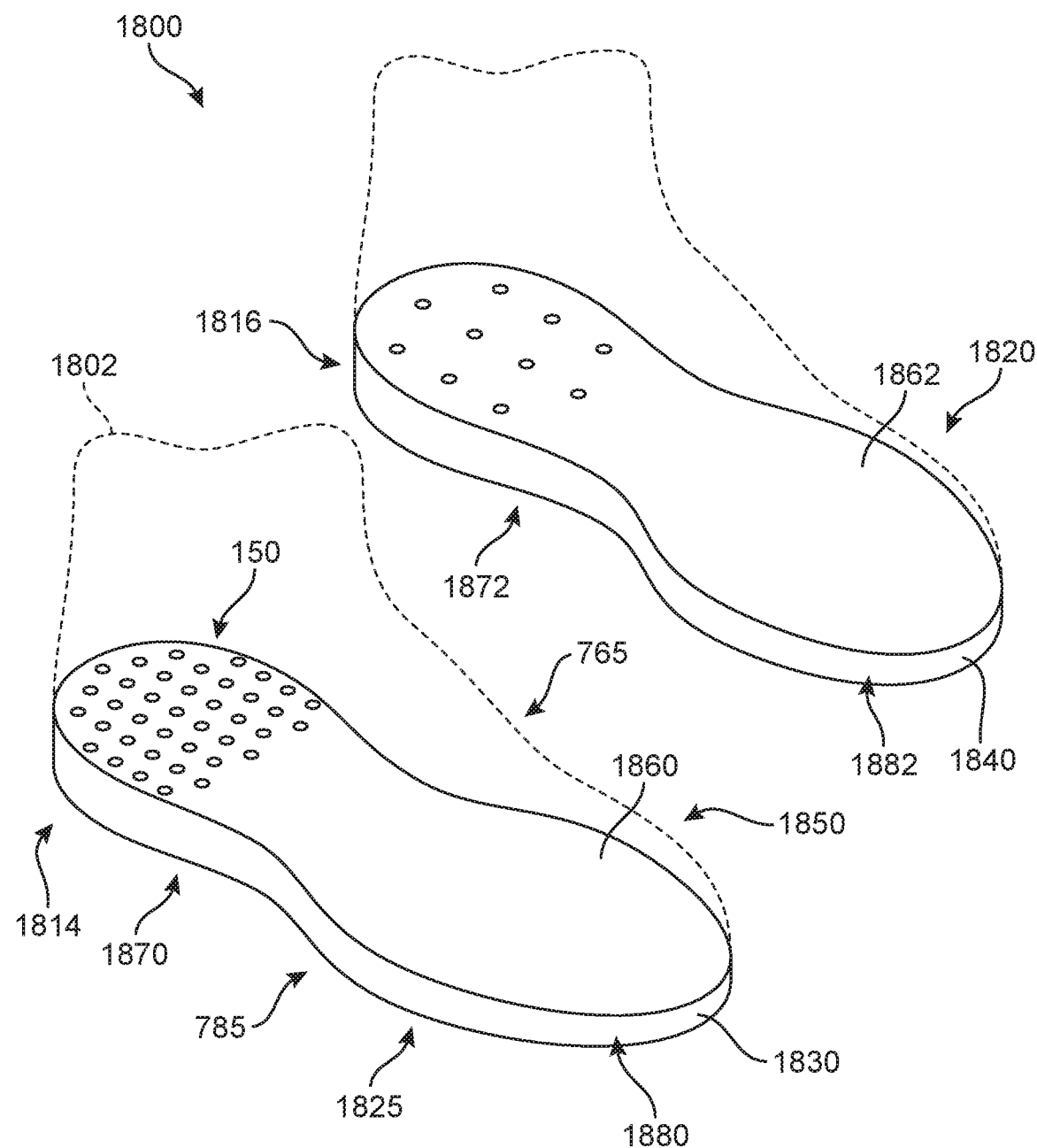
FIG. 18 is an isometric view of an embodiment of a pair of footwear including a first sole member and a second sole member.

Referring now to FIG. 18, one embodiment of a first pair of footwear ("first pair") 1800 is shown. First pair 1800 can be configured as any type of footwear including, but not limited to, hiking boots, soccer shoes, football shoes, sneakers, rugby shoes, basketball shoes, baseball shoes as well as other kinds of footwear. Each article of footwear in first pair 1800 can comprise an upper 1802 and a sole structure 1825. Sole structure 1825 can be secured to upper 1802 and extend between the foot and the ground when the article is worn. In different embodiments, sole structure 1825 may include different components. For example, sole structure 1825 may include an outsole, a midsole, and/or an insole. In some cases, one or more of these components may be optional. In one embodiment, each sole structure 1825 may include a sole member, as described above.

Referring to FIG. 18, first pair 1800 is a complementary pair of footwear, and includes a first article of footwear ("first article") 1850 for a left foot and a second article of footwear ("second article") 1820 for a right foot. As noted above, each of the two articles of footwear can comprise upper 1802 and sole structure 1825. In different embodiments, sole structures may include different components. Specifically, in FIG. 18, first article 1850 includes a first customized sole member ("first member") 1830, and second article 1820 includes a second customized sole member ("second member") 1840. First member 1830 and second member 1840 are complementary with respect to one another. Each sole member is secured to respective upper 1802 (shown in dotted lines) and extends between the foot and the ground when first pair 1800 is worn by a user.

For purposes of this discussion, a complementary pair of articles refers to two articles of footwear that are designed to be worn as a pair by one user on a right foot and a left foot. Similarly, a complementary pair of sole members refers to two sole members that are designed or configured for use by one user on a left foot and a right foot.

Furthermore, for purposes of reference, a first upper surface 1860 is provided on the upper side of first member 1830, and a second upper surface 1862 is provided on the upper side of second member 1840. In addition, a first lower surface 1870 is provided on the bottom side of first member 1830, and a second lower surface 1872 is provided on the bottom side of second member 1840. Extending along the perimeter and thickness between first upper surface 1860 and first lower surface 1870 is a first sidewall 1880. Similarly, extending along the perimeter and thickness between second upper surface 1862 and second lower surface 1872 is a second sidewall 1882. Together, first upper surface 1860, first lower surface 1870, and first sidewall 1880 comprise an exterior surface of first member 1830. Likewise, second upper surface 1862, second lower surface 1872, and second sidewall 1882 together comprise an exterior surface of second member 1840.

Disposed along different portions of both first member 1830 and second member 1840 are apertures 150. Apertures 150 can extend through a thickness of first member 1830 and second member 1840, as described earlier. In some embodiments, apertures 150 may be disposed over a majority of the heel region of first member 1830 and/or second member 1840. In other embodiments, apertures 150 may be disposed in only a few portions of the heel region of first member 1830 and/or second member 1840. In FIG. 18, apertures 150 are shown formed along first upper surface 1860 and second upper surface 1862. Thus, openings in the sole member surface are visible in different areas of the heel region of first upper surface 1860 and second upper surface 1862. It should be understood that the bottom surface (not shown) of each sole member may also include holes. In some embodiments, the bottom surface may include openings corresponding to a second end of any through-hole apertures that have been formed in the sole member.

It should be understood that, in different embodiments, the design and/or configuration of the sole members in a complementary pair of footwear may vary. In some cases, they may vary in the arrangement, number, and/or size of apertures. In one embodiment, the sole members can be customized according to the heel-cushioning rating provided by a customer for each article of a complementary pair of footwear. In other words, the configuration of sole members for a left foot or for a right foot may vary based on the heel cushioning properties desired by the customer for each foot.

As shown in FIG. 18, second member 1840 includes apertures 150 disposed in a different configuration than first member 1830. In first member 1830, apertures 150 are disposed along a first heel region 1814 in a pattern of greater density relative to apertures 150 disposed along a second heel region 1816 of second member 1840. Furthermore, first member 1830 includes a substantially greater number of apertures 150 than second member 1840.

Thus, in some embodiments, a pair of articles may include sole members that differ with respect to the left foot and the right foot of a user. In other words, in different embodiments, the configuration of the sole member for a left foot may vary significantly with respect to the configuration of the sole member for a right foot. For purposes of this description, "configuration" encompasses all features of the sole members, including shape, size, number, orientation, and location of apertures. It should be noted that in some conventional embodiments, shoes can be mirror images of one another, including the sole members. In other words, in some conventional embodiments, each article in a pair of footwear is generally symmetrical with respect to each another. However, while a pair of shoes of any type conventionally includes a right shoe that is a mirror image of the left shoe, in order to provide the same functionality to corresponding portions of each foot, this may not be optimal for users that require asymmetrical cushioning to optimize foot movement and comfort.

For purposes of this description, the terms "symmetric configuration" and "asymmetric configuration" are used to characterize pairs of articles and/or sole members of articles. As used herein, two sole members have a symmetric configuration when the pair of sole members has symmetry about some common axis. In other words, the pair of sole members has a symmetric configuration when one sole member is a mirror image of the other sole member. In contrast, two sole members have an asymmetric configuration when there is no axis about which the sole members have symmetry. In other words, the pair of sole members has an asymmetric configuration when the mirror image of one sole member is not identical to the other sole member. For example, in one embodiment, the aperture pattern(s) associated with a "left" article are not the same as the aperture pattern(s) on the complementary "right" article when the lower surface of the two sole members face one another in a mirror-image configuration. Thus, asymmetric can mean the sole members have no axis about which the aperture pattern(s) associated with two complementary sole members can be made symmetric (e.g., line up), or correspond exactly with one another.

It may be further understood that the characterizations of symmetric and asymmetric may be with reference to all features of the sole members, or with reference to only some subset of features. In particular, given a feature of the sole members, the sole members may be considered as symmetric or asymmetric with respect to that feature. In the following embodiments, for example, specific consideration is given to the asymmetry of the sole members with respect to one or more apertures in the sole member. It should also be understood that while a pair of articles of footwear may generally include some level of asymmetry, the asymmetry described herein is primarily directed to asymmetry in the location or number, shape, size, geometry, and/or orientation of apertures in the sole members. Asymmetry may also be provided by variations in the stiffness or rigidity of the sole members. In some embodiments, this asymmetrical heel cushioning between first article 1850 and second article 1820 may provide a more natural feel to a user.

Thus, it should be understood that the methods described herein with respect to FIGS. 1-21 may be applicable to a second, complementary article of footwear in different embodiments. In other words, in some embodiments, a manufacturer may provide a first pair of footwear to a user with a first level of heel cushioning, and the customer may provide feedback to the manufacturer regarding the heel cushioning in the left article of footwear and the heel cushioning in the right article of footwear.

Each of these ratings can be used to design and provide a new pair of footwear to the customer, where the heel cushioning associated with each of the two articles in the new pair of footwear may differ from each other or be substantially similar.

Figure 19:
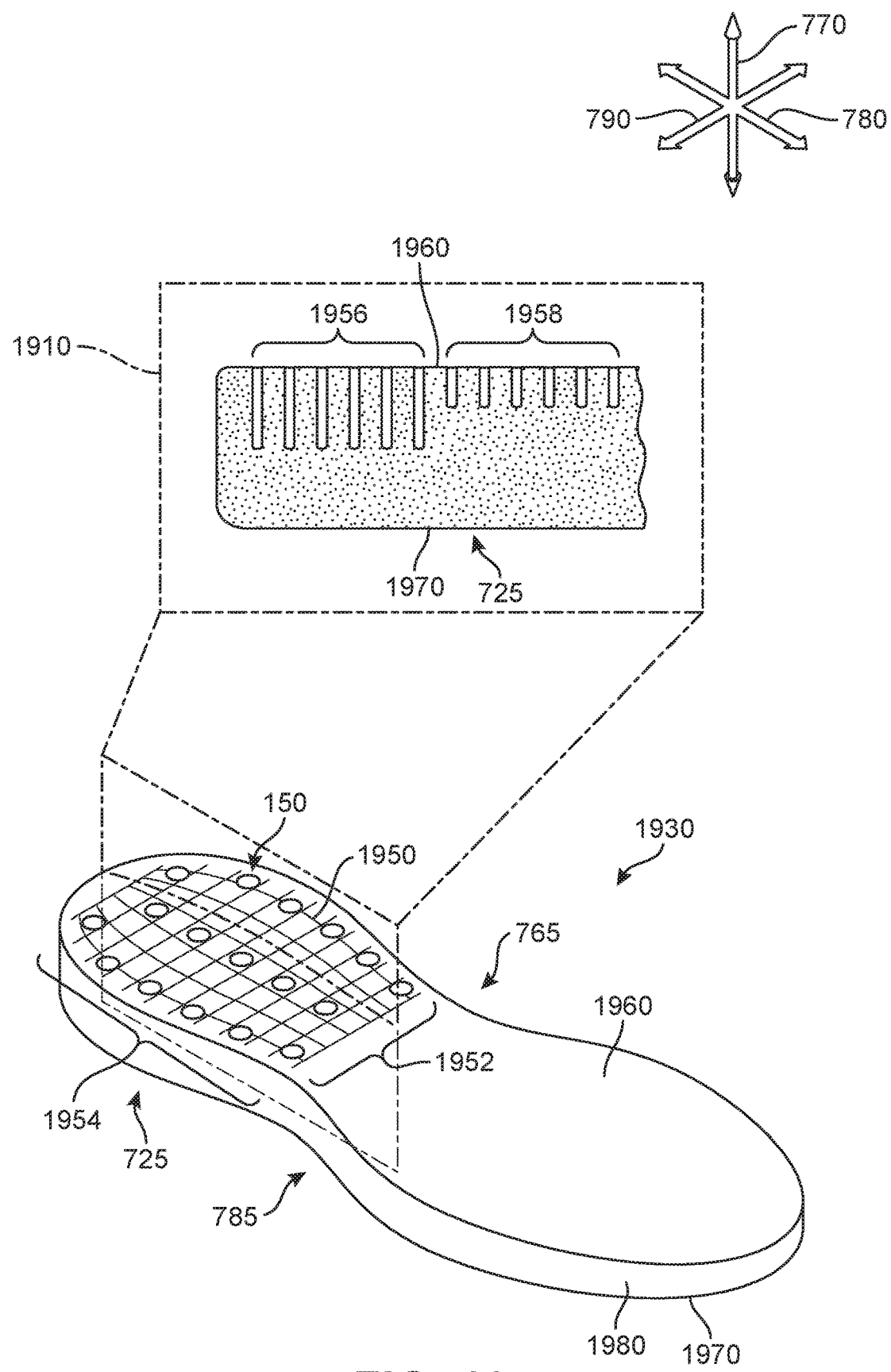
FIG. 19 is an isometric view of an embodiment of a sole member.
Figure 20:
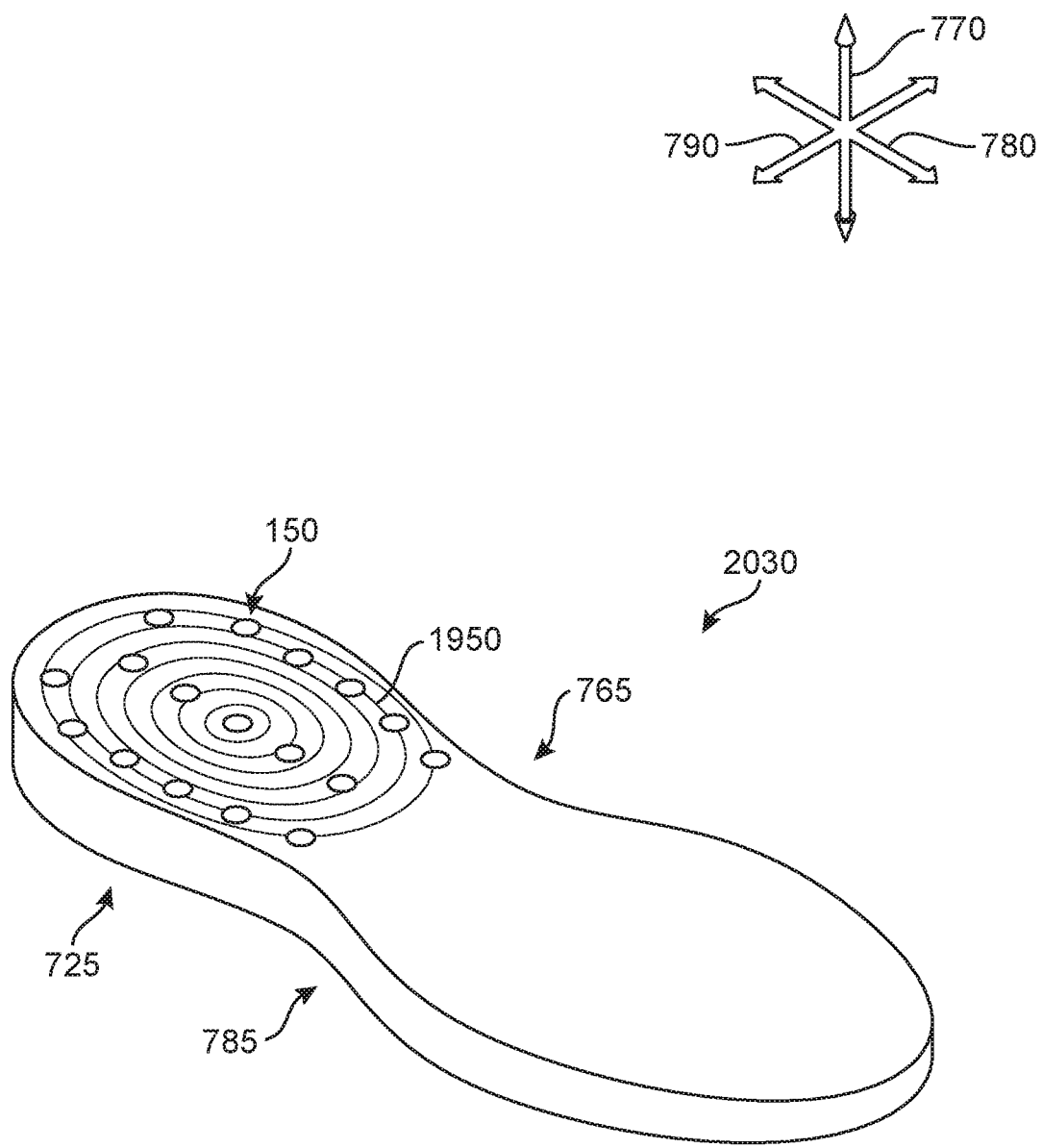
FIG. 20 is an isometric view of an embodiment of a sole member.
Figure 21:
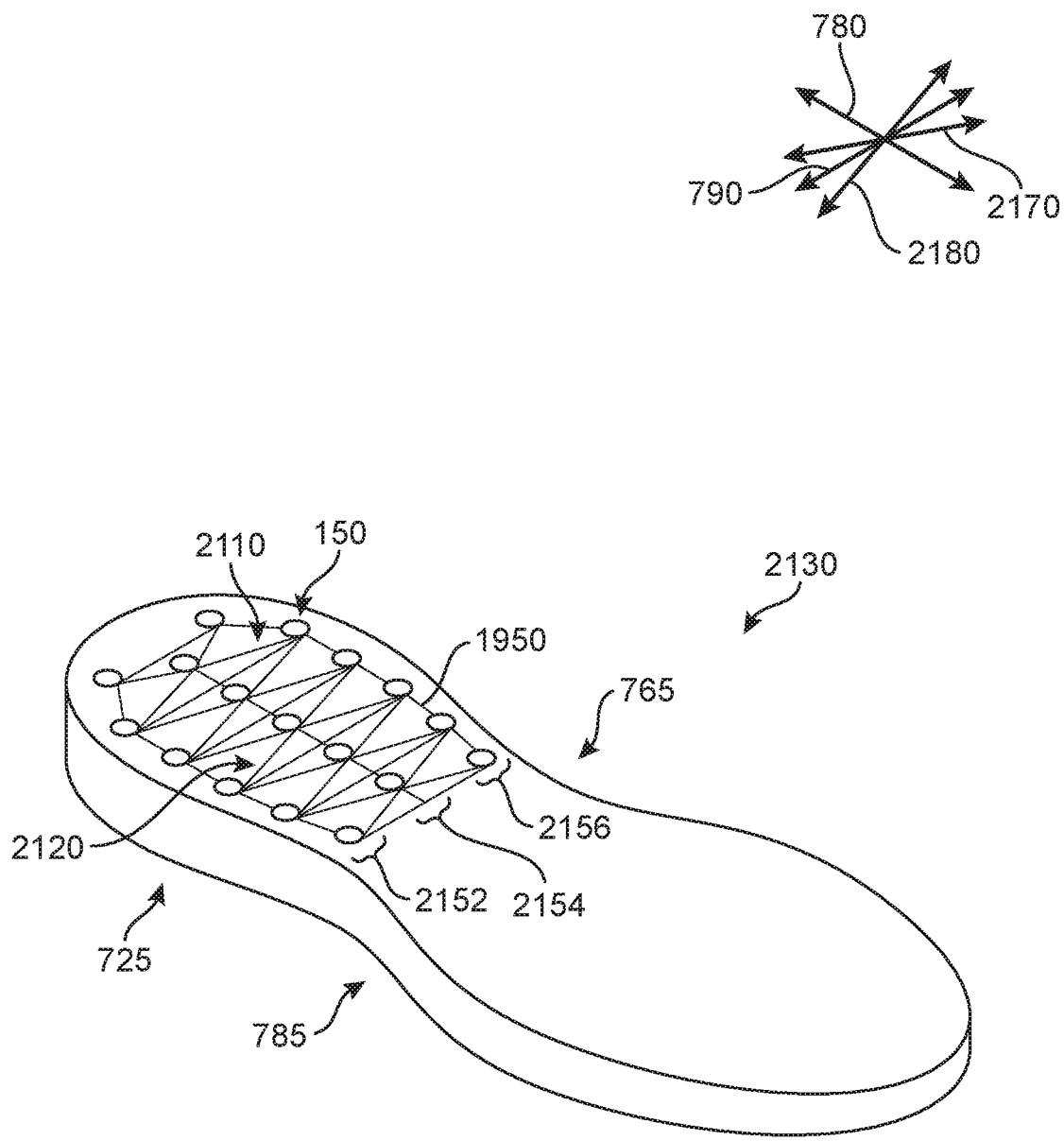
FIG. 21 is an isometric view of an embodiment of a sole member.

In different embodiments, the cushioning characteristics of a sole member may be adjusted through other variations in material comprising the sole member. As noted above, the cushioning of a sole member may be varied through the removal of material in different portions of the sole member. Referring now to FIGS. 19-21, three additional examples of sole members with customized cushioning characteristics are depicted. In some embodiments, a sole member may include other or additional means of decoupling or varying the cushioning characteristics through the heel region of the sole member. For example, as will be discussed in detail further below, a sole member may include one or more incisions that decouple or otherwise alter the cushioning characteristics of the sole member.

In FIG. 19, an embodiment of a third customized member ("third member") 1930 for an article of footwear is illustrated. For purposes of reference, a third upper surface 1960 is provided on the upper-facing side of third member 1930, and a third lower surface 1970 is provided on the bottom-facing side of third member 1930. Extending along the perimeter and thickness between third upper surface 1960 and third lower surface 1970 is a third sidewall 1980. Together, third upper surface 1960, third lower surface 1970, and third sidewall 1980 comprise an exterior surface of third member 1930.

Similar to FIG. 18, apertures 150 are disposed throughout a rearward portion of third member 1930. Apertures 150 can extend through a thickness of third member 1930, as described earlier. In some embodiments, apertures 150 may be disposed over a majority of the heel region of third member 1930. In other embodiments, apertures 150 may be disposed in only a few portions of the heel region of third member 1930. In FIG. 19, apertures 150 are shown formed along third upper surface 1960. Thus, openings in the sole member surface are visible in different areas of the heel region of third upper surface 1960. It should be understood that the bottom surface (not shown) of the sole member may also include holes. In some embodiments, the bottom surface may include openings corresponding to a second end of any through-hole apertures that have been formed in the sole member, for example.

As shown in FIG. 19, third member 1930 includes apertures 150 arranged in three columns extending in a direction substantially parallel to longitudinal axis 780. In FIG. 19, each column is generally spaced apart at regular intervals from neighboring apertures. However, it should be understood that in other embodiments the apertures may be arranged closer together or further apart than depicted here.

In addition, FIG. 19 provides an example of an additional means by which the cushioning characteristics of a sole member may be varied. As noted above, in some embodiments, a sole member may include one or more incisions 1950. For purposes of this description, incisions 1950 are openings, apertures, holes, tunnels, or spaces that are disposed within a sole member. Incisions 1950 can comprise a void in some embodiments. As will be discussed further below, in some embodiments, incisions 1950 are initially formed along an exterior or outer surface of a sole member, and can extend any distance, and along any orientation, through an interior portion (e.g., the thickness, breadth, or width) of the sole member. It should be understood that the terms exterior or outer surface with reference to a sole member do not necessarily indicate whether the sole member is actually exposed to the outer elements. Instead, an outer surface or exterior surface refers to the outermost, outward-facing layer of the sole member. Throughout the specification, it should be understood that characteristics being described as associated with a single aperture or aperture set can also characterize any other incision or set of incisions that may be referred to in the various embodiments.

In some embodiments, incisions 1950 can provide means for decoupling or softening portions of a sole member in order to enhance its cushioning characteristics. In different embodiments, incisions 1950 can be arranged to increase responsiveness, comfort, resilience, shock absorption, elasticity, and/or stability present in a portion of the layer. Furthermore, incisions 1950 can be formed in various portions of a layer to produce regions between adjacent portions of the layer that are better able to articulate or bend with respect to one another. For example, in some cases, incisions 1950 can be formed in side portions and a lower portion of a sole member to reduce the cross-sectional profile of the sole member at particular regions and/or to facilitate increased flexibility between various portions of the sole member. In one embodiment, incisions 1950 can be applied to side portions and an upper portion to form regions between adjacent portions of the sole member that articulate or bend with respect to one another. It should be understood that the methods described above with respect to the formation of apertures may be utilized in the formation of incisions. Thus, in some embodiments, incisions may be formed through laser cutting or other cutting processes, as noted above.

In different embodiments, incisions 1950 can have different dimensions. In one embodiment, incisions 1950 have a generally elongated shape, such that the length of the incision is substantially greater than its width. In other embodiments, incisions 1950 may include a wide variety of other geometries, including regular and irregular shapes. In some embodiments, different incisions 1950 may each be associated with a variety of depths, where each depth may be chosen to impart specific aesthetic or functional properties to a cushioning member. In some embodiments, incisions 1950 can be provided on or through a lower surface (nearer to the ground-contacting surface) or an upper surface (nearer to an upper) of the sole member. In other cases, incisions 1950 can be provided on or through a side surface of the sole member. In one embodiment, incisions 1950 can be provided on or through the sidewall surfaces of the sole member as well as on the lower surface and the upper surface of the sole member.

Generally, incisions 1950 can comprise various slits or cuts arranged in a variety of orientations and in a variety of locations on or through the sole member. In some embodiments, one or more incisions 1950 can extend in a direction generally aligned with a vertical axis through a thickness of the sole member. Thus, in one embodiment, an incision comprises an opening (i.e., gaps or spaces) along an exterior surface of the sole member. In other words, incisions 1950 may extend from an initial cut along an exterior surface to form slits of varying depths through the thickness of a sole member. Incisions 1950 may be blind-slit incisions in some embodiments, where only one end of each of the incision is open or exposed, while the opposite end of each of the incision remains enclosed within the thickness of the element (i.e., only one end of each incision may be exposed on an exterior surface of the element). However, in other embodiments, incisions 1950 may be through-hole slits, such that an incision includes two exposed ends, and both ends are "open" along an exterior surface of the sole member. For purposes of this disclosure, incisions 1950 are generally narrow and long, in contrast to apertures 150, which are generally cylindrical holes. Thus, in some embodiments, incisions 1950 may be substantially narrow or thin, such that adjacent sides of the interior of the sole member material associated with the incision may touch or press against one another when the incision is compressed or closed.

In different embodiments, incisions 1950 may have a variety of regular and irregular shapes. In some embodiments, incisions 1950 may form straight lines, curved lines, arcs, wavy lines, ellipses, circles, triangles, squares, rectangles, pentagons, and hexagons, for example. Similarly, incisions 1950 may form different shapes such that one is circular and another is a straight line, for example. In some embodiments, incisions 1950 may comprise a series of repeating straight line or curved line cuts through the sole member, or another incision shape may be repeated as series of overlapping or neighboring rings (see FIG. 20).

In different embodiments, incisions 1950 may be arranged along a sole member along varying orientations. In some embodiments, a sole member may only include incisions 1950 extending along one direction. However, in other embodiments, incisions 1950 can be arranged at varying directions with respect to other incisions 1950. For example, in FIG. 19, incisions 1950 include a substantially longitudinally oriented first set 1952 and a substantially laterally oriented second set 1954. It can be seen that in some cases, two or more incisions may intersect. In FIG. 19, first set 1952 and second set 1954 together form a type of grid arrangement, intersecting at multiple points along heel region 725. The grid arrangement may provide a wearer with a more uniform cushioning in heel region 725 in some embodiments.

Furthermore, as noted above, the depth of an incision may vary. Depending on, for example, the optimum level of cushioning, the incision depth may be greater in sole members where a greater degree of cushioning is desired. Similarly, if less cushioning is desired, the incision depth may be relatively less (i.e., an incision may be more shallow). In FIG. 19, an isometric cutaway view 1910 provides an illustration of two possible depth selections of incisions 1950. In cutaway view 1910, a third set 1956 of incisions 1950 and a fourth set 1958 of incisions 1950 are shown in heel region 725, where each of the incisions extend from third upper surface 1960 toward third lower surface 1970. Third set 1956 is disposed further rearward relative to fourth set 1958 in this embodiment, though in other embodiments, the sets may be formed elsewhere in heel region 725. For purposes of clarity, cutaway view 1910 only illustrates a portion of laterally oriented second set 1954. In other words, regions of second set 1954 shown in cutaway view 1910 are shown in isolation, and do not include portions of incisions 1950 associated with longitudinally oriented first set 1952. However, it should be understood that the varying depths as described herein can be applicable to incisions 1950 arranged along any orientation. Thus, incisions 1950 of longitudinally oriented first set 1952 (or any of the types of incisions described herein) may also be cut or formed to extend along different depths, as shown in the example provided in cutaway view 1910.

In different embodiments, some blind-slit incisions 1950 may be cut to extend between 10% and 75% of the thickness of the sole member. In some embodiments, blind-slit incisions 1950 may be cut to extend between 20% and 60% of the thickness of the sole member. In FIG. 19, as one example, two different depths are illustrated. In fourth set 1958, incisions 1950 extend approximately 25% through the thickness of third member 1930, while in third set 1956, incisions 1950 extend approximately 50% through the thickness of third member 1930. In some embodiments, the increased depth of third set 1956 relative to fourth set 1958 may be associated with a greater level of cushioning along the region associated with third set 1956. In other embodiments, the depths of the incisions may be varied to form other patterns throughout the sole member. In some embodiments, each incision formed can have a different depth. In other embodiments, the depth of incisions 1950 can oscillate (i.e., gradually increasing and/or gradually decreasing) in a direction. In one embodiment, there may be a staggered arrangement, where every other incision is a first size, and other, neighboring incisions are a second size. Furthermore, it can be seen that incisions 1950 can overlap or merge with apertures 150 in some embodiments to form regions of increased cushioning in some embodiments. However, apertures 150 may also be spaced apart from incisions 1950 in some embodiments.

Referring now to FIG. 20, another example of a cushioning configuration is illustrated in a fourth customized sole member ("fourth member") 2030. In fourth member 2030, incisions 1950 include a series of concentric rings formed along heel region 725. While there are seven concentric rings depicted in FIG. 20, it should be understood that in other embodiments, any number of rings may be included. In addition, the spacing between each ring may be increased or decreased. Furthermore, some portions of each incision can overlap, merge with, surround, and/or intersect with one or more apertures 150 in some embodiments, as shown in FIG. 20. It may also be understood that while substantially oval rings are depicted in fourth member 2030, any other shape may be formed in the sole member in other embodiments.

In different embodiments, multiple incisions 1950 can be arranged adjacent to one another to form various geometric shapes or patterns through the sole member. In FIG. 21, an additional example of a cushioning configuration is shown in a fifth customized sole member ("fifth member") 2130. In fifth member 2130, incisions 1950 include a series of substantially linear slits formed along heel region 725. Fifth member 2130 includes three columns of longitudinally oriented incisions 1950, including a first column 2152, a second column 2154, and a third column 2156. In some embodiments, incisions 1950 can be oriented along other directions. As shown in FIG. 21, fifth member 2130 also includes a plurality of diagonally oriented incisions, including a fifth set 2110 of incisions and a sixth set 2120 of incisions, where the incisions of fifth set 2110 are oriented in a direction substantially aligned with a first diagonal axis 2170, and wherein the incisions of sixth set 2120 are oriented in a direction substantially aligned with a second diagonal axis 2180. Thus, in some embodiments, incisions 1950 can criss-cross or form a lattice-like arrangement, intersecting at various angles throughout heel region 725.

Furthermore, apertures 150 may be arranged to correspond or complement the arrangement of incisions 1950 in some embodiments. Generally, it can be understood that the length of each incision extends a distance between a first end and a second end. As shown in FIG. 21, the first end of each incision is disposed adjacent to an aperture, and the second end of the incision is disposed adjacent to an aperture. In other words, incisions may be formed to extend between or lie between two apertures in some embodiments. In one embodiment, incisions may be specifically configured to extend between one aperture and another aperture, providing a kind of hollowed bridge or slit-type connection between the two apertures. In different embodiments, this can allow apertures 150 and incisions 1950 to interact with and provide a combined effect to allow a specialized cushioning response in the sole member.

In addition, in some embodiments, apertures 150 and incisions 1950 can form a cooperative support system in fifth member 2130. In some embodiments, this arrangement can provide improved comfort in fifth member 2130, as well as increased responsiveness and durability. This configuration may also, for example, more readily distribute forces throughout fifth member 2130 in heel region 725.

Thus, in the present embodiments, the operation of the sole member can involve providing a material variance in the element through the inclusions of elongated or narrow cuts of material (slits) through the sole member comprising varying shapes and depths. As described above with respect to FIGS. 19-21, in some embodiments, the cut-outs can involve a removal of material from the element, thereby providing softer and/or cushioned regions in the portions that include the incisions.

Providing a customer with a means of customizing heel cushioning can provide a variety of benefits to the customer. In some embodiments, the use of custom sole members in orthotics for an article of footwear can help support weakened areas of a foot and assist the user in each step. While a relatively rigid material, as may be included in a custom sole member, can provide functional support to the foot, softer or more flexible regions associated with apertures can absorb the loads put on the foot and provide protection. Such softer or cushioned regions can better absorb the loads placed on a foot, increase stabilization, and take pressure off uncomfortable or sore spots of the feet.

Other embodiments or variations of custom sole members may include other aperture patterns or various combinations of the above-disclosed designs. In different embodiments, each customized sole member may include further variations not depicted in the figures. Some variations may include differences in shape, size, contour, elevations, depressions, curvatures, and other variations of the sole member. In other words, the custom sole members depicted herein are merely intended to provide an example of the many types of heel cushioning sole member configurations that fall within the scope of the present discussion.

Furthermore, in different embodiments, sole members as well as any apertures and/or incisions in the sole members discussed herein may be formed using any other method known in the art. In some embodiments, any removal process (i.e., where a portion of a material is removed, subtracted, eliminated, etc.) may be used to form one or more apertures and/or incisions (e.g., apertures 150 and/or incisions 1950). For example, in some embodiments, a mechanical process may be used including, but not limited to, ultrasonic machining, water jet machining, abrasive jet machining, abrasive water jet machining, ice jet machining, and/or magnetic abrasive finishing. In other embodiments, chemical processes may be utilized including, but not limited to, chemical milling, photochemical milling, and/or eletropolishing. In addition, in some embodiments, electrochemical processes may be used. In other embodiments, thermal processes can be used, such as electrodischarge machining (EDM), laser beam machining, electron beam machining, plasma beam machining, and/or ion beam machining, or other processes. In another embodiment, hybrid electrochemical processes can be utilized including, but not limited to, electrochemical grinding, electrochemical honing, electrochemical superfinishing, and/or electrochemical buffing. In one embodiment, hybrid thermal processes may be used, such as electroerosion dissolution machining. In other embodiments, the material comprising the sole member may be modified using chemical processes, including temperature changes (e.g., freezing the material). Furthermore, the processes for forming the apertures and/or incisions may be applied or utilized after the article of footwear has been assembled, or the sole member has been associated with an upper or sole structure. In other words, the formation of apertures and/or incisions in a sole member may occur during a post-manufacturing process in the article of footwear.

Embodiments may include a customization cycle to optimize the value of a structural characteristic in the heel region (e.g., the cushioning characteristics of the heel region). Some of the embodiments described herein discuss modifying the materials and/or the material variance of the heel region through voids (apertures) or incisions, in the sole member. Embodiments may include one or more of the methods, processes, structures, features and/or systems disclosed in: (a) Cook et al., U.S. patent application Ser. No. 15/055,129, filed Feb. 26, 2016, and titled "Method of Customizing Forefoot Cushioning in Articles of Footwear," (b) Cook et al., U.S. patent application Ser. No. 15/055,086, filed Feb. 26, 2016, and titled "Method of Customizing Stability in Articles of Footwear," and (c) Cook et al., U.S. patent application Ser. No. 15/055,016, filed Feb. 26, 2016, and titled "Method of Customizing Articles of Footwear;" all of these applications are hereby incorporated by reference in their entirety. It should be understood that other embodiments of the customization cycle can involve any of the methods, systems, processes, or features of the systems and/or methods discussed in the applications above.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A method of manufacturing customized articles of footwear using a customization cycle, comprising:
storing information relating to a first article of footwear in a manner to associate the first article of footwear (a) with a user and (b) with a first specific iteration of a customization cycle associated with the user;
transmitting data to a computing system of the user for:
(a) generating a rating system for evaluating a first level of heel cushioning of a first sole member of the first article of footwear, wherein the first sole member includes a first base sole layer, and (b) requesting input from the user through the computing system including a customer-selected rating of the first level of heel cushioning;
receiving the customer-selected rating from the user for the first level of heel cushioning;
storing the customer-selected rating in a manner to associate the customer-selected rating with the first article of footwear and with the first specific iteration of the customization cycle;
receiving an order from the user for new shoes;
in response to receipt of the order, manufacturing a second article of footwear customized for the user, including:
  (i) selecting a second base sole layer;
  (ii) forming at least a first aperture in a heel portion of the second base sole layer to form a second sole member with a second level of heel cushioning, wherein the second level of heel cushioning is different from the first level of heel cushioning and is determined based on the customer-selected rating of the first level of heel cushioning in the first article of footwear; and
  (iii) forming the second article of footwear having the second sole member that includes the second base sole layer;
selling the second article of footwear including the second sole member to the user; and
storing: (a) purchase history information indicating the second article of footwear as being owned by the user and (b) information associating the second article of footwear with a second specific iteration of the customization cycle associated with the user.

2. The method of claim 1, wherein the first aperture is formed using a laser.

3. The method of claim 1, wherein the rating system for evaluating the first level of heel cushioning includes rating a degree of rigidity of a heel region of the first sole member.

4. The method of claim 1, wherein the rating system is provided via an application program running on a mobile computing device.

5. The method of claim 1, wherein the rating system for evaluating the first level of heel cushioning includes a sliding scale for receiving the customer-selected rating of the first level of heel cushioning.

6. The method of claim 1, wherein the rating system for evaluating the first level of heel cushioning includes plural sliding scales for receiving customer-selected ratings of multiple aspects of heel-cushioning characteristics associated with the first level of heel cushioning.

7. The method of claim 1, further comprising:
providing the user with a rating system for evaluating the second level of heel cushioning and requesting input from the user including a customer-selected rating of the second level of heel cushioning;
receiving the customer-selected rating from the user for the second level of heel cushioning;
storing the customer-selected rating of the second level of heel cushioning in a manner to associate the customer-selected rating of the second level heel cushioning with the second article of footwear and with the second specific iteration of the customization cycle;
selecting a third base sole layer;
forming at least a second aperture in a heel portion of the third base sole layer to form a third sole member with a third level of heel cushioning, wherein the third level of heel cushioning is different from the second level of heel cushioning and is determined based on the customer-selected rating of the second level of heel cushioning in the second article of footwear;
manufacturing a third article of footwear customized for the user and having the third sole member that includes the third base sole layer;
selling the third article of footwear including the third sole member to the user; and
storing: (a) purchase history information indicating the third article of footwear as being owned by the user and (b) information associating the third article of footwear with a third specific iteration of the customization cycle associated with the user.

8. The method of claim 7, wherein the first aperture is formed to have a round horizontal cross-sectional shape, wherein the second aperture is formed to have a round horizontal cross-sectional shape, and wherein a horizontal cross-sectional size of the second aperture is larger than a horizontal cross-sectional size of the first aperture.

9. A method of manufacturing customized articles of footwear using a customization cycle, comprising:
storing information relating to a first article of footwear in a manner to associate the first article of footwear (a) with a user and (b) with a first specific iteration of a customization cycle associated with the user;
transmitting data to a computing system of the user for: (a) generating a rating system for evaluating a first level of heel cushioning of a first sole member of the first article of footwear, wherein the first sole member includes a first base sole layer having a first heel portion, and (b) requesting input from the user through the computing system including a customer-selected rating of the first level of heel cushioning;
receiving the customer-selected rating from the user for the first level of heel cushioning;
storing the customer-selected rating in a manner to associate the customer-selected rating with the first article of footwear and with the first specific iteration of the customization cycle;
receiving an order from the user for new shoes;
in response to receipt of the order, selecting a second base sole layer with a second heel portion to form a second sole member with a second level of heel cushioning, wherein a material composition of the second heel portion is determined based on the customer-selected rating of the first level of heel cushioning in the first article of footwear;
manufacturing a second article of footwear customized for the user, the second article of footwear having the second sole member that includes the second base sole layer, wherein the second heel portion is fixedly attached to the second base sole layer;
selling the second article of footwear that includes the second sole member to the user, wherein the second sole member is fixedly attached to the second article of footwear; and
storing: (a) purchase history information indicating the second article of footwear as being owned by the user and (b) information associating the second article of footwear with a second specific iteration of the customization cycle associated with the user.

10. The method of claim 9, further comprising forming at least a first aperture in the second heel portion of the second base sole layer.

11. The method of claim 9, further comprising forming at least one incision in the second heel portion of the second base sole layer.

12. The method of claim 9, wherein the step of selecting the second base sole layer includes selecting the second base sole layer from a set of base sole layers, wherein each base sole layer of the set of base sole layers has a heel portion with a different degree of cushioning from other base sole layers of the set of base sole layers.

13. The method of claim 9, wherein a first thickness of the first heel portion is different from a second thickness of the second heel portion.

14. The method of claim 9, further comprising forming at least a first aperture in the second heel portion of the second base sole layer using a laser.

15. The method of claim 9, wherein the rating system is provided via an application program running on a mobile computing device.

16. The method of claim 9, wherein the rating system for evaluating the first level of heel cushioning includes a sliding scale for receiving the customer-selected rating of the first level of heel cushioning.

17. The method of claim 9, wherein the rating system for evaluating the first level of heel cushioning includes plural sliding scales for receiving customer-selected ratings of multiple aspects of heel-cushioning characteristics associated with the first level of heel cushioning.

18. The method of claim 9, wherein the rating system for evaluating the first level of heel cushioning includes plural inputs for receiving customer-selected ratings of multiple aspects of heel-cushioning characteristics associated with the first level of heel cushioning, wherein the multiple aspects of heel-cushioning characteristics include two or more aspects selected from the group consisting of: resiliency of heel cushioning, rigidity of heel cushioning, shock absorption of heel cushioning, and comfort of heel cushioning.

19. The method of claim 1, further comprising:
receiving a customer-selected rating from the user for the second level of heel cushioning;
storing the customer-selected rating of the second level of heel cushioning in a manner to associate the customer-selected rating of the second level heel cushioning with the second article of footwear and with the second specific iteration of the customization cycle;
selecting a third base sole layer;
forming at least a second aperture in a heel portion of the third base sole layer to form a third sole member with a third level of heel cushioning, wherein the third level of heel cushioning is different from the second level of heel cushioning and is determined based on the customer-selected rating of the second level of heel cushioning in the second article of footwear;
manufacturing a third article of footwear customized for the user and having the third sole member that includes the third base sole layer;
selling the third article of footwear including the third sole member to the user; and
storing: (a) purchase history information indicating the third article of footwear as being owned by the user and (b) information associating the third article of footwear with a third specific iteration of the customization cycle associated with the user.

20. The method of claim 1, wherein the rating system for evaluating the first level of heel cushioning includes plural inputs for receiving customer-selected ratings of multiple aspects of heel-cushioning characteristics associated with the first level of heel cushioning, wherein the multiple aspects of heel-cushioning characteristics include two or more aspects selected from the group consisting of: resiliency of heel cushioning, rigidity of heel cushioning, shock absorption of heel cushioning, and comfort of heel cushioning.

* * * * *